(12) United States Patent
Ryoo et al.

(10) Patent No.: US 8,665,066 B2
(45) Date of Patent: Mar. 4, 2014

(54) READER CONTROL SYSTEM

(75) Inventors: Seung Hyup Ryoo, Gyeonggi-do (KR); Jin Tae Kim, Seoul (KR); Sang Cheol Min, Seoul (KR); Hee Seung Kim, Seoul (KR); Jae Joon Park, Gyeonggi-do (KR); Dong Hyun Lee, Seoul (KR); Yong Sam Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 878 days.

(21) Appl. No.: 11/912,625

(22) PCT Filed: Apr. 25, 2006

(86) PCT No.: PCT/KR2006/001564
§ 371 (c)(1),
(2), (4) Date: Jun. 18, 2008

(87) PCT Pub. No.: WO2006/115372
PCT Pub. Date: Nov. 2, 2006

(65) Prior Publication Data
US 2008/0290993 A1 Nov. 27, 2008

Related U.S. Application Data

(60) Provisional application No. 60/674,765, filed on Apr. 25, 2005, provisional application No. 60/689,784, filed on Jun. 9, 2005, provisional application No. 60/719,460, filed on Sep. 21, 2005, provisional application No. 60/757,480, filed on Jan. 10, 2006.

(51) Int. Cl.
*H04Q 5/22* (2006.01)
(52) U.S. Cl.
USPC .................. 340/10.1; 340/10.31; 340/10.32
(58) Field of Classification Search
USPC .......... 340/825, 10.1–10.6, 572.1–572.9, 1.1; 235/375–385
See application file for complete search history.

(56) References Cited

U.S. PATENT DOCUMENTS

| | | | |
|---|---|---|---|
| 4,730,307 A | 3/1988 | Hughes et al. | |
| 5,375,252 A | 12/1994 | Hashimoto | |
| 5,610,595 A | 3/1997 | Garrabrant et al. | |
| 5,619,444 A | 4/1997 | Agranat et al. | |
| 5,640,002 A * | 6/1997 | Ruppert et al. | 235/462.46 |
| 5,668,803 A | 9/1997 | Tymes et al. | |

(Continued)

FOREIGN PATENT DOCUMENTS

| | | |
|---|---|---|
| JP | 11-338739 A | 12/1999 |
| KR | 10-2000-0069897 A | 11/2000 |

(Continued)

OTHER PUBLICATIONS

"An Authentication Protocol in a Security Layer for RFID Smart Tags" (IEE MELECON 2004, May 12-15, 2004, Dubrovnik, Croatia); Martin Feldhofer Institute for Applied Information Processing and Communications (IAIK) Graz University of Technology, Inffeldgasse 16a, 8010 Graz, Austria; Email: Martin.Feldhofer@iaik.tugraz.at.

(Continued)

*Primary Examiner* — Brian Zimmerman
*Assistant Examiner* — James Yang
(74) *Attorney, Agent, or Firm* — Birch, Stewart, Kolasch & Birch, LLP

(57) ABSTRACT

An RFID reader control system and method is provided. A protocol for controlling an RFID reader and an RFID reader control unit of a mobile phone is defined. Messages, information, commands, responses, and notification are constructed and transmitted between the RFID reader and the RFID reader control unit.

7 Claims, 11 Drawing Sheets

(56) References Cited

U.S. PATENT DOCUMENTS

| | | | |
|---|---|---|---|
| 5,671,020 A | 9/1997 | Law | |
| 5,686,902 A * | 11/1997 | Reis et al. | 340/10.2 |
| 5,793,661 A | 8/1998 | Dulong et al. | |
| 5,896,375 A | 4/1999 | Dent et al. | |
| 5,917,840 A * | 6/1999 | Cheney et al. | 714/807 |
| 5,952,922 A * | 9/1999 | Shober | 340/572.4 |
| 5,973,613 A * | 10/1999 | Reis et al. | 340/7.23 |
| 6,122,505 A | 9/2000 | Genell et al. | |
| 6,138,228 A | 10/2000 | Douady | |
| 6,154,486 A | 11/2000 | Scott et al. | |
| 6,172,596 B1 | 1/2001 | Cesar et al. | |
| 6,209,112 B1 | 3/2001 | Stevenson | |
| 6,330,971 B1 * | 12/2001 | Mabry et al. | 235/383 |
| 6,336,142 B1 | 1/2002 | Kato et al. | |
| 6,343,292 B1 | 1/2002 | Roach et al. | |
| 6,379,058 B1 | 4/2002 | Petteruti et al. | |
| 6,430,677 B2 | 8/2002 | Pechanek et al. | |
| 6,590,962 B1 | 7/2003 | Groessl et al. | |
| 6,680,979 B2 | 1/2004 | Kato et al. | |
| 6,690,979 B1 | 2/2004 | Smith | |
| 6,782,044 B1 | 8/2004 | Wright et al. | |
| 6,804,578 B1 * | 10/2004 | Ghaffari | 700/229 |
| 6,812,824 B1 | 11/2004 | Goldinger et al. | |
| 6,892,052 B2 | 5/2005 | Kotola et al. | |
| 6,912,211 B2 | 6/2005 | Gerakoulis | |
| 6,940,392 B2 | 9/2005 | Chan et al. | |
| 6,946,950 B1 | 9/2005 | Ueno et al. | |
| 6,957,219 B1 | 10/2005 | Lin et al. | |
| 6,960,999 B2 | 11/2005 | Haimovitch et al. | |
| 6,970,066 B2 | 11/2005 | Sakamoto et al. | |
| 6,985,757 B2 | 1/2006 | Liu et al. | |
| 7,032,080 B2 | 4/2006 | Mugitani et al. | |
| 7,054,298 B1 | 5/2006 | Kim et al. | |
| 7,088,246 B2 | 8/2006 | Fukuoka | |
| 7,099,294 B2 | 8/2006 | Sayeedi | |
| 7,212,121 B2 | 5/2007 | Hashimoto | |
| 7,221,269 B2 | 5/2007 | Onderko et al. | |
| 7,257,107 B2 | 8/2007 | Swier, Jr. et al. | |
| 7,271,674 B1 | 9/2007 | Butenhoff et al. | |
| 7,274,909 B2 | 9/2007 | Perttila et al. | |
| 7,277,016 B2 | 10/2007 | Moskowitz et al. | |
| 7,283,037 B2 | 10/2007 | Diorio et al. | |
| 7,333,479 B2 | 2/2008 | Jalkanen et al. | |
| 7,336,926 B2 | 2/2008 | Noda et al. | |
| 7,369,635 B2 | 5/2008 | Spital et al. | |
| 7,437,585 B2 | 10/2008 | Nakano et al. | |
| 7,471,745 B2 | 12/2008 | Anim-Appiah et al. | |
| 7,474,211 B2 | 1/2009 | Kramer | |
| 7,546,469 B2 | 6/2009 | Suzuki et al. | |
| 7,565,391 B2 | 7/2009 | Hu | |
| RE40,883 E | 8/2009 | Pechanek et al. | |
| 7,573,916 B1 | 8/2009 | Bechtolsheim et al. | |
| 7,577,261 B2 | 8/2009 | Liu et al. | |
| 7,602,274 B2 | 10/2009 | Lee et al. | |
| 7,603,465 B2 | 10/2009 | Akashika et al. | |
| 7,646,300 B2 | 1/2010 | Stewart et al. | |
| 7,656,837 B2 | 2/2010 | Gerakoulis | |
| 7,667,572 B2 * | 2/2010 | Husak et al. | 340/10.1 |
| 7,705,712 B2 | 4/2010 | Kelly et al. | |
| RE41,530 E | 8/2010 | Wood, Jr. | |
| 7,768,389 B2 | 8/2010 | Frank | |
| 7,772,963 B2 | 8/2010 | Davis | |
| 7,792,043 B2 | 9/2010 | McNutt et al. | |
| 7,835,314 B2 | 11/2010 | Yee et al. | |
| 7,873,767 B2 | 1/2011 | Moritani et al. | |
| 7,884,702 B2 | 2/2011 | Drago et al. | |
| 7,932,876 B2 | 4/2011 | Jo et al. | |
| 8,115,595 B2 | 2/2012 | Ryoo et al. | |
| 8,115,604 B2 | 2/2012 | Ryoo et al. | |
| 8,378,790 B2 | 2/2013 | Ryoo et al. | |
| 2001/0038032 A1 | 11/2001 | Kang et al. | |
| 2002/0174254 A1 | 11/2002 | Kita et al. | |
| 2002/0175805 A9 | 11/2002 | Armstrong et al. | |
| 2003/0032451 A1 | 2/2003 | Hu | |
| 2003/0120745 A1 | 6/2003 | Katagishi et al. | |
| 2003/0179730 A1 | 9/2003 | Lee et al. | |
| 2003/0223599 A1 | 12/2003 | Abe et al. | |
| 2003/0227392 A1 | 12/2003 | Ebert et al. | |
| 2004/0003276 A1 | 1/2004 | Kouznetsov | |
| 2004/0032308 A1 | 2/2004 | Cheung et al. | |
| 2004/0048608 A1 | 3/2004 | Matsuo et al. | |
| 2004/0065733 A1 | 4/2004 | Fukuoka | |
| 2004/0107246 A1 | 6/2004 | Akashika et al. | |
| 2004/0117423 A1 | 6/2004 | Shi et al. | |
| 2004/0160310 A1 | 8/2004 | Chen et al. | |
| 2004/0202137 A1 | 10/2004 | Gerakoulis | |
| 2004/0214524 A1 | 10/2004 | Noda et al. | |
| 2004/0264441 A1 | 12/2004 | Jalkanen et al. | |
| 2005/0015536 A1 | 1/2005 | Lee | |
| 2005/0030929 A1 | 2/2005 | Swier et al. | |
| 2005/0043028 A1 | 2/2005 | Suomi | |
| 2005/0096031 A1 | 5/2005 | Sugaya et al. | |
| 2005/0108559 A1 | 5/2005 | Suzuki et al. | |
| 2005/0162256 A1 | 7/2005 | Kinoshita | |
| 2005/0195930 A1 | 9/2005 | Spital et al. | |
| 2005/0199716 A1 | 9/2005 | Shafer et al. | |
| 2005/0272377 A1 | 12/2005 | Oh et al. | |
| 2005/0283607 A1 | 12/2005 | Zhang et al. | |
| 2006/0006987 A1 | 1/2006 | Hashimoto et al. | |
| 2006/0044113 A1 | 3/2006 | Hashimoto et al. | |
| 2006/0049250 A1 | 3/2006 | Sullivan | |
| 2006/0148480 A1 | 7/2006 | Thorson et al. | |
| 2006/0152217 A1 | 7/2006 | Withanawasam | |
| 2006/0174150 A1 | 8/2006 | Nakano et al. | |
| 2006/0187031 A1 | 8/2006 | Moretti et al. | |
| 2006/0274657 A1 | 12/2006 | Olgaard et al. | |
| 2007/0014341 A1 | 1/2007 | Rowse et al. | |
| 2007/0024426 A1 | 2/2007 | Akiyama et al. | |
| 2007/0030797 A1 | 2/2007 | Baek | |
| 2007/0075834 A1 | 4/2007 | Armstrong et al. | |
| 2007/0096883 A1 | 5/2007 | Kim | |
| 2007/0136626 A1 | 6/2007 | Chung | |
| 2007/0171201 A1 | 7/2007 | Pi et al. | |
| 2007/0229926 A1 | 10/2007 | Morisaki et al. | |
| 2007/0276984 A1 | 11/2007 | Schuessler | |
| 2007/0291756 A1 | 12/2007 | Akhtar et al. | |
| 2008/0010622 A1 | 1/2008 | Hsu et al. | |
| 2008/0059659 A1 | 3/2008 | Moritani et al. | |
| 2008/0065792 A1 | 3/2008 | Wu et al. | |
| 2008/0068133 A1 | 3/2008 | Hashimoto et al. | |
| 2008/0094183 A1 | 4/2008 | Fukushima et al. | |
| 2008/0125885 A1 | 5/2008 | McNutt et al. | |
| 2008/0133789 A1 | 6/2008 | McNutt et al. | |
| 2008/0139117 A1 | 6/2008 | Madine et al. | |
| 2008/0141073 A1 | 6/2008 | Shih et al. | |
| 2008/0262770 A1 | 10/2008 | Higaki et al. | |
| 2009/0003828 A1 | 1/2009 | So | |
| 2009/0006675 A1 | 1/2009 | Rofougaran | |
| 2009/0033493 A1 | 2/2009 | Lin et al. | |
| 2009/0075630 A1 | 3/2009 | McLean | |
| 2009/0201529 A1 | 8/2009 | Takahara | |
| 2009/0282154 A1 | 11/2009 | Akashika et al. | |
| 2010/0027523 A1 | 2/2010 | Chan et al. | |
| 2010/0248783 A1 | 9/2010 | Jolivet | |
| 2010/0289627 A1 | 11/2010 | Mcallister et al. | |

FOREIGN PATENT DOCUMENTS

| | | |
|---|---|---|
| KR | 10-2005-0021612 | 3/2005 |
| WO | 2004/079970 | 9/2004 |
| WO | WO 2004/079970 A2 | 9/2004 |

OTHER PUBLICATIONS

"An Ubiquitous Architectural Framework and Protocol for Object Tracking using RFID Tags" Pradip De, Kalyan Basu and Sajl K. Das; Center for Research in Wireless Mobility and Networking (CReW-MaN) Department of Computer Science and Engineering University of Texas at Arlington, TX 76019-0015 □pradipde, basu, dasV#cse.uta.edu.

* cited by examiner

Fig. 5

| Type L | UID (64 bits) | | |
|---|---|---|---|
| | Manufacturer (16bits) | H/W Type (16bits) | Memory Layout (48bits) |
| | User Data (Variable) | | |

| Type M | UID (64 bits) | | | | | |
|---|---|---|---|---|---|---|
| | Manufacturer (16bits) | H/W Type (16bits) | EAC (8bits) | AFID (8bits) | SDF (8bits) | USL (8bits) |
| | ASL (8bits) | | | | | |

| Type N | TID Bank Length (16bits) | TID Bank (variable) | UII Length (16-bit) |
|---|---|---|---|
| | PC (16-bit) | UII or UII Set (variable) | |
| | User Data (variable) | | |

| Type O | Arg 1 (8bits) | Arg 2 (16bits) |
|---|---|---|

| Type P | Access Password (32 bits) | UII Length (16bits) | |
|---|---|---|---|
| | UII (variable) | | New UII Length (16bits) |
| | New UII (variable) | | PC (16bits) |

| Type Q | UID (64 bits) | |
|---|---|---|
| | Start Addr (16 bits) | Length (16 bits) |
| | User Data (Variable) | |

| Type R | Access Password (32 bits) | UII Length (16bits) | |
|---|---|---|---|
| | UII (variable) | | Start Address (16bits) |
| | Length (16bits) | User Data (variable) | |

| Type S | UID (64 bits) | |
|---|---|---|
| | Memory Layout (48 bits) | User Data Length (16bits) |
| | User Data (variable) | |

Fig. 6

Type T
| Access Password (32 bits) | UII Length (16bits) | |
| --- | --- | --- |
| UII (variable) | | New UII Length (16bits) |
| New UII (variable) | | PC (16bits) |
| User Data Length (16bits) | User Data (variable) | |
| Reserved Bank Length (16bits) | Reserved Bank Data (variable) | |

Type U
| Access Password (32 bits) | Kill Password (32 bits) |
| --- | --- |
| UII Length (16bits) | UII (variable) |

Type V
| UID (64 bits) |
| --- |
| Arg 1 (8 bits) |

Type W
| Access Password (32 bits) | UII Length (16bits) | |
| --- | --- | --- |
| UII (variable) | | Lock Data (24bits) |

Type X
| DR | M (2bits) | TR | Sel (2bits) | S (2bits) | T | Q (4bits) | LpDn (3bits) |
| --- | --- | --- | --- | --- | --- | --- | --- |

Fig. 7

| Preamble | Msg Type | Code | PL(MSB) | PL (LSB) | Arg | End Mark |
| --- | --- | --- | --- | --- | --- | --- |
| 0xBB | 0x00 | 0x01 | 0x00 | 0x01 | 0xFF | 0x7E |

Fig. 8

| Preamble | Msg Type | Code | PL (MSB) | PL (LSB) | Arg | End Mark |
| --- | --- | --- | --- | --- | --- | --- |
| 0xBB | 0x01 | 0x01 | 0x00 | 0x01 | 0x00 | 0x7E |

Fig. 9

| Preamble | Msg Type | Code | PL (MSB) | PL (LSB) | Arg | End Mark |
| --- | --- | --- | --- | --- | --- | --- |
| 0xBB | 0x00 | 0x02 | 0x00 | 0x01 | 0xFF | 0x7E |

Fig. 10

| Preamble | Msg Type | Code | PL (MSB) | PL (LSB) | Arg | End Mark |
| --- | --- | --- | --- | --- | --- | --- |
| 0xBB | 0x01 | 0x02 | 0x00 | 0x01 | 0x00 | 0x7E |

Fig. 11

| Preamble | Msg Type | Code | PL (MSB) | PL (LSB) | Arg | End Mark |
| --- | --- | --- | --- | --- | --- | --- |
| 0xBB | 0x00 | 0x03 | 0x00 | 0x01 | 0x02 | 0x7E |

Fig. 12

| Preamble | Msg Type | Code | PL (MSB) | PL (LSB) | | | |
| --- | --- | --- | --- | --- | --- | --- | --- |
| 0xBB | 0x01 | 0x03 | 0x00 | 0x0E | 0x4C(L) | 0x47(G) | 0x20( ) |
| Argument | | | | | | | |
| 0x45(E) | 0x4C(L) | 0x45(E) | 0x43(C) | 0x54(T) | 0x52(R) | 0x4F(O) | 0x4E(N) |
| | | | End Mark | | | | |
| 0x49(I) | 0x43(C) | 0x53(S) | 0x7E | | | | |

Fig. 13

| Preamble | Msg Type | Code | PL (MSB) | PL (LSB) | Arg | End Mark |
| --- | --- | --- | --- | --- | --- | --- |
| 0xBB | 0x01 | 0x03 | 0x00 | 0x01 | 0x03 | 0x7E |

Fig. 14

| Preamble | Msg Type | Code | PL (MSB) | PL (LSB) | End Mark |
| --- | --- | --- | --- | --- | --- |
| 0xBB | 0x00 | 0x04 | 0x00 | 0x00 | 0x7E |

Fig. 15

| Preamble | Msg Type | Code | PL (MSB) | PL (LSB) | Arg | End Mark |
|---|---|---|---|---|---|---|
| 0xBB | 0x01 | 0x04 | 0x00 | 0x01 | 0x4B | 0x7E |

Fig. 16

| Preamble | Msg Type | Code | PL (MSB) | PL (LSB) | Arg | End Mark |
|---|---|---|---|---|---|---|
| 0xBB | 0x00 | 0x05 | 0x00 | 0x01 | 0x32 | 0x7E |

Fig. 17

| Preamble | Msg Type | Code | PL (MSB) | PL (LSB) | Arg | End Mark |
|---|---|---|---|---|---|---|
| 0xBB | 0x01 | 0x05 | 0x00 | 0x01 | 0x00 | 0x7E |

Fig. 18

| Preamble | Msg Type | Code | PL (MSB) | PL (LSB) | End Mark |
|---|---|---|---|---|---|
| 0xBB | 0x00 | 0x06 | 0x00 | 0x00 | 0x7E |

Fig. 19

| Preamble | Msg Type | Code | PL (MSB) | PL (LSB) | Arg | End Mark |
|---|---|---|---|---|---|---|
| 0xBB | 0x01 | 0x06 | 0x00 | 0x01 | 0x01 | 0x7E |

Fig. 20

| Preamble | Msg Type | Code | PL (MSB) | PL (LSB) | Arg | End Mark |
|---|---|---|---|---|---|---|
| 0xBB | 0x00 | 0x07 | 0x00 | 0x01 | 0x01 | 0x7E |

Fig. 21

| Preamble | Msg Type | Code | PL (MSB) | PL (LSB) | Arg | End Mark |
|---|---|---|---|---|---|---|
| 0xBB | 0x01 | 0x07 | 0x00 | 0x01 | 0x00 | 0x7E |

Fig. 22

| Preamble | Msg Type | Code | PL (MSB) | PL (LSB) | End Mark |
|---|---|---|---|---|---|
| 0xBB | 0x00 | 0x08 | 0x00 | 0x00 | 0x7E |

Fig. 23

| Preamble | Msg Type | Code | PL (MSB) | PL (LSB) | Arg | End Mark |
|---|---|---|---|---|---|---|
| 0xBB | 0x01 | 0x08 | 0x00 | 0x01 | 0x00 | 0x7E |

Fig. 24

| Preamble | Msg Type | Code | PL (MSB) | PL (LSB) | End Mark |
|---|---|---|---|---|---|
| 0xBB | 0x00 | 0x09 | 0x00 | 0x00 | 0x7E |

Fig. 25

| Preamble | Msg Type | Code | PL (MSB) | PL (LSB) | MI | BM | Addr |
|---|---|---|---|---|---|---|---|
| 0xBB | 0x01 | 0x09 | 0x00 | 0x03 | 0x00 | 0xFF | 0x0F |

| End Mark |
|---|
| 0x7E |

Fig. 26

| Preamble | Msg Type | Code | PL (MSB) | PL (LSB) | MI | BM | Addr |
|---|---|---|---|---|---|---|---|
| 0xBB | 0x00 | 0x0A | 0x00 | 0x03 | 0x00 | 0xFF | 0x0F |

| End Mark |
|---|
| 0x7E |

Fig. 27

| Preamble | Msg Type | Code | PL (MSB) | PL (LSB) | Arg | End Mark |
|---|---|---|---|---|---|---|
| 0xBB | 0x01 | 0x0A | 0x00 | 0x01 | 0x00 | 0x7E |

Fig. 28

| Preamble | Msg Type | Code | PL (MSB) | PL (LSB) | End Mark |
|---|---|---|---|---|---|
| 0xBB | 0x00 | 0x0B | 0x00 | 0x00 | 0x7E |

Fig. 29

| Preamble | Msg Type | Code | PL (MSB) | PL (LSB) | T | A | M | Ptr(MSB) | |
|---|---|---|---|---|---|---|---|---|---|
| 0xBB | 0x01 | 0x0B | 0x00 | 0x0B | 000 | 000 | 11 | 0x00 | 0x00 |
| | Ptr(LSB) | Length | T | RFU | Mask(MSB) | | | | Mask(LSB) |
| 0x00 | 0xFF | 0x20 | 0 | 0000000 | 0xFF | 0xFF | 0x00 | | 0x00 |
| End Mark | | | | | | | | | |
| 0x7E | | | | | | | | | |

Fig. 30

| Preamble | Msg Type | Code | PL (MSB) | PL (LSB) | T | A | M | Ptr(MSB) | |
|---|---|---|---|---|---|---|---|---|---|
| 0xBB | 0x00 | 0x0C | 0x00 | 0x0B | 000 | 000 | 11 | 0x00 | 0x00 |
| | Ptr(LSB) | Length | T | RFU | Mask(MSB) | | | | Mask(LSB) |
| 0x00 | 0xFF | 0x20 | 0 | 0000000 | 0xFF | 0xFF | 0x00 | | 0x00 |
| End Mark | | | | | | | | | |
| 0x7E | | | | | | | | | |

Fig. 31

| Preamble | Msg Type | Code | PL (MSB) | PL (LSB) | Arg | End Mark |
|---|---|---|---|---|---|---|
| 0xBB | 0x01 | 0x0C | 0x00 | 0x01 | 0x00 | 0x7E |

Fig. 32

| Preamble | Msg Type | Code | PL (MSB) | PL (LSB) | End Mark |
|---|---|---|---|---|---|
| 0xBB | 0x00 | 0x0D | 0x00 | 0x00 | 0x7E |

Fig. 33

| Preamble | Msg Type | Code | PL (MSB) | | | | | | | |
|---|---|---|---|---|---|---|---|---|---|---|
| 0xBB | 0x01 | 0x0D | 0x00 | | | | | | | |
| PL (LSB) | DR | M | TR | Sel | S | T | Q | UpDn | End Mark | |
| 0x00 | 0 | 00 | 0 | 00 | 00 | 0 | 1000 | 000 | 0x7E | |

Fig. 34

| Preamble | Msg Type | Code | PL (MSB) | | | | | | | |
|---|---|---|---|---|---|---|---|---|---|---|
| 0xBB | 0x00 | 0x0E | 0x00 | | | | | | | |
| PL (LSB) | DR | M | TR | Sel | S | T | Q | UpDn | End Mark | |
| 0x02 | 0 | 00 | 0 | 00 | 00 | 0 | 1000 | 000 | 0x7E | |

Fig. 35

| Preamble | Msg Type | Code | PL (MSB) | PL (LSB) | Arg | End Mark |
|---|---|---|---|---|---|---|
| 0xBB | 0x01 | 0x0E | 0x00 | 0x01 | 0x00 | 0x7E |

Fig. 36

| Preamble | Msg Type | Code | PL (MSB) | PL (LSB) | End Mark |
|---|---|---|---|---|---|
| 0xBB | 0x00 | 0x0F | 0x00 | 0x00 | 0x7E |

Fig. 37

| Preamble | Msg Type | Code | PL (MSB) | PL (LSB) | Arg1(MSB) | Arg1(LSB) | Arg2 |
|---|---|---|---|---|---|---|---|
| 0xBB | 0x01 | 0x0F | 0x00 | 0x03 | 0x00 | 0x32 | 0x32 |
| End Mark | | | | | | | |
| 0x7E | | | | | | | |

Fig. 38

| Preamble | Msg Type | Code | PL (MSB) | PL (LSB) | Arg1(MSB) | Arg1(LSB) | Arg2 |
|---|---|---|---|---|---|---|---|
| 0xBB | 0x00 | 0x10 | 0x00 | 0x03 | 0x00 | 0x32 | 0x32 |
| End Mark | | | | | | | |
| 0x7E | | | | | | | |

Fig. 39

| Preamble | Msg Type | Code | PL (MSB) | PL (LSB) | Arg | End Mark |
|---|---|---|---|---|---|---|
| 0xBB | 0x01 | 0x10 | 0x00 | 0x01 | 0x00 | 0x7E |

Fig. 40

| Preamble | Msg Type | Code | PL (MSB) | PL (LSB) | End Mark |
|---|---|---|---|---|---|
| 0xBB | 0x00 | 0x21 | 0x00 | 0x00 | 0x7E |

Fig. 41

| Preamble | Msg Type | Code | PL (MSB) | PL (LSB) | US(MSB) | | |
|---|---|---|---|---|---|---|---|
| 0xBB | 0x01 | 0x21 | 0x00 | 0x11 | 0xE0 | 0x35 | 0x00 |
| | | | US(LSB) | MFG(MSB) | MFG(LSB) | IIT(MSB) | |
| 0x00 | 0x00 | 0x00 | 0x01 | 0x00 | 0x12 | 0x34 | 0x56 |
| HT(LSB) | EAC | AFID | SDF | USL | ASL | End Mark | |
| 0x78 | 0x0A | 0x01 | 0x00 | 0x08 | 0x10 | 0x7E | |

Fig. 42

| Preamble | Msg Type | Code | PL (MSB) | PL (LSB) | End Mark |
|---|---|---|---|---|---|
| 0xBB | 0x00 | 0x22 | 0x00 | 0x00 | 0x7E |

Fig. 43

| Preamble | Msg Type | Code | PL (MSB) | PL (LSB) | PC(MSB) | PC(LSB) | UII(MSB) |
|---|---|---|---|---|---|---|---|
| 0xBB | 0x01 | 0x22 | 0x00 | 0x0E | 0x20 | 0x00 | 0x30 |
| 0xF4 | 0x25 | 0x7B | 0xF4 | 0x62 | 0x5F | 0x80 | 0x00 |
| | | UII(LSB) | End Mark | | | | |
| 0x00 | 0x00 | 0x02 | 0x7E | | | | |

Fig. 44

| Preamble | Msg Type | Code | PL (MSB) | PL (LSB) | UID(MSB) | | |
|---|---|---|---|---|---|---|---|
| 0xBB | 0x00 | 0x23 | 0x00 | 0x0C | 0xE0 | 0x35 | 0x00 |
| | | | UID(LSB) | SA(MSB) | SA(LSB) | UDL(MSB) | |
| 0x00 | 0x00 | 0x00 | 0x01 | 0x00 | 0x00 | 0x00 | |
| UDL(LSB) | End Mark | | | | | | |
| 0x08 | 0x7E | | | | | | |

Fig. 45

| Preamble | Msg Type | Code | PL (MSB) | PL (LSB) | US(MSB) | | |
|---|---|---|---|---|---|---|---|
| 0xBB | 0x01 | 0x23 | 0x00 | 0x08 | 0x12 | 0x34 | 0x56 |
| | | | US(LSB) | End Mark | | | |
| 0x78 | 0x9A | 0xBC | 0xDE | 0xF0 | 0x7E | | |

Fig. 46

| Preamble | Msg Type | Code | PL (MSB) | PL (LSB) | UII(MSB) | | |
|---|---|---|---|---|---|---|---|
| 0xBB | 0x00 | 0x24 | 0x00 | 0x10 | 0x30 | 0xF4 | 0x25 |
| | | | | | | SA(LSB) | |
| 0x7B | 0xF4 | 0x62 | 0x5F | 0x80 | 0x00 | 0x00 | 0x00 |
| | SA(MSB) | SA(LSB) | UDL(MSB) | UDL(LSB) | End Mark | | |
| 0x02 | 0x00 | 0x00 | 0x00 | 0x0F | 0x7E | | |

Fig. 47

| Preamble | Msg Type | Code | PL (MSB) | PL (LSB) | Arg(MSB) | | |
|---|---|---|---|---|---|---|---|
| 0xBB | 0x01 | 0x24 | 0x00 | 0x0F | 0x46(F) | 0x4C(L) | 0x41(A) |
| 0x54(T) | 0x52(R) | 0x4F(O) | 0x4E(N) | 0x20( ) | 0x4C(L) | 0x31(1) | 0x37(7) |
| | | | Arg(LSB) | End Mark | | | |
| 0x34(4) | 0x30(0) | 0x42(B) | 0x51(Q) | 0x7E | | | |

Fig. 48

| Preamble | Msg Type | Code | PL (MSB) | PL (LSB) | UDL(MSB) | UDL(LSB) | End Mark |
|---|---|---|---|---|---|---|---|
| 0xBB | 0x00 | 0x25 | 0x00 | 0x02 | 0x00 | 0x0F | 0x7E |

Fig. 49

| Preamble | Msg Type | Code | PL (MSB) | PL (LSB) | UID(MSB) | | |
|---|---|---|---|---|---|---|---|
| 0xBB | 0x01 | 0x25 | 0x00 | 0x19 | 0xE0 | 0x35 | 0x00 |
| | | | | UID(LSB) | MFG(MSB) | MFG(LSB) | HT(MSB) |
| 0x00 | 0x00 | 0x00 | 0x00 | 0x01 | 0x12 | 0x34 | 0x56 |
| HT(LSB) | ML(MSB) | | | | | ML(LSB) | UD(MSB) |
| 0x78 | 0x00 | 0x00 | 0x00 | 0x00 | 0x00 | 0x00 | 0x46(F) |
| 0x4C(L) | 0x41(A) | 0x54(T) | 0x52(R) | 0x4F(O) | 0x4E(N) | 0x20( ) | 0x4C(L) |
| | | | | | UD(LSB) | End Mark | |
| 0x31(1) | 0x37(7) | 0x34(4) | 0x30(0) | 0x42(B) | 0x51(Q) | 0x7E | |

Fig. 50

| Preamble | Msg Type | Code | PL (MSB) | PL (LSB) | UDL(MSB) | UDL(LSB) | End Mark |
|---|---|---|---|---|---|---|---|
| 0xBB | 0x00 | 0x26 | 0x00 | 0x02 | 0x00 | 0x0E | 0x7E |

Fig. 51

| Preamble | Msg Type | Code | PL (MSB) | PL (LSB) | TBL(MSB) | TBL(LSB) | TB(MSB) |
|---|---|---|---|---|---|---|---|
| 0xBB | 0x01 | 0x26 | 0x00 | 0x25 | 0x00 | 0x04 | 0xA9 |
| | | TB(LSB) | UL(MSB) | UL(LSB) | PC(MSB) | PC(LSB) | UII(MSB) |
| 0x86 | 0x54 | 0xE2 | 0x00 | 0x0C | 0x20 | 0x00 | 0x30 |
| 0xF4 | 0x25 | 0x7B | 0xF4 | 0x62 | 0x5F | 0x80 | 0x00 |
| | | UII(LSB) | UD(MSB) | | | | |
| 0x00 | 0x00 | 0x02 | 0x46(F) | 0x4C(L) | 0x41(A) | 0x54(T) | 0x52(R) |
| 0x4F(O) | 0x4E(N) | 0x20( ) | 0x4C(L) | 0x31(1) | 0x37(7) | 0x34(4) | 0x30(0) |
| UD(LSB) | End Mark | | | | | | |
| 0x42(B) | 0x7E | | | | | | |

Fig. 52

| Preamble | Msg Type | Code | PL (MSB) | PL (LSB) | Code | RC(MSB) | RC(LSB) |
|---|---|---|---|---|---|---|---|
| 0xBB | 0x00 | 0x27 | 0x00 | 0x03 | 0x21 | 0x00 | 0x64 |
| End Mark | | | | | | | |
| 0x7E | | | | | | | |

Fig. 53

| Preamble | Msg Type | Code | PL (MSB) | PL (LSB) | Arg | End Mark |
|---|---|---|---|---|---|---|
| 0xBB | 0x01 | 0x27 | 0x00 | 0x01 | 0x00 | 0x7E |

Fig. 54

| Preamble | Msg Type | Code | PL (MSB) | PL (LSB) | Arg | End Mark |
|---|---|---|---|---|---|---|
| 0xBB | 0x02 | 0x27 | 0x00 | 0x01 | 0x1F | 0x7E |

Fig. 55

| Preamble | Msg Type | Code | PL (MSB) | PL (LSB) | End Mark |
|---|---|---|---|---|---|
| 0xBB | 0x00 | 0x28 | 0x00 | 0x00 | 0x7E |

Fig. 56

| Preamble | Msg Type | Code | PL (MSB) | PL (LSB) | Arg | End Mark |
|---|---|---|---|---|---|---|
| 0xBB | 0x01 | 0x28 | 0x00 | 0x01 | 0x00 | 0x7E |

Fig. 57

| Preamble | Msg Type | Code | PL (MSB) | PL (LSB) | AP(MSB) | | |
|---|---|---|---|---|---|---|---|
| 0xBB | 0x00 | 0x41 | 0x00 | 0x23 | 0x87 | 0x65 | 0x43 |
| AP(LSB) | UL(MSB) | UL(LSB) | UII(MSB) | | | | |
| 0x21 | 0x00 | 0x0C | 0x30 | 0xF4 | 0x25 | 0x7B | 0xF4 |
| | | | | | | UII(LSB) | NUL(MSB) |
| 0x62 | 0x5F | 0x80 | 0x00 | 0x00 | 0x00 | 0x01 | 0x00 |
| NUL(LSB) | NU(MSB) | | | | | | |
| 0x0C | 0x30 | 0xF4 | 0x25 | 0x7B | 0xF4 | 0x62 | 0x5F |
| | | | | NU(LSB) | PC(MSB) | PC(LSB) | End Mark |
| 0x80 | 0x00 | 0x00 | 0x00 | 0x02 | 0x20 | 0x00 | 0x7E |

Fig. 58

| Preamble | Msg Type | Code | PL (MSB) | PL (LSB) | Arg | End Mark |
|---|---|---|---|---|---|---|
| 0xBB | 0x01 | 0x41 | 0x00 | 0x01 | 0x00 | 0x7E |

Fig. 59

| Preamble | Msg Type | Code | PL (MSB) | PL (LSB) | UID(MSB) | | |
|---|---|---|---|---|---|---|---|
| 0xBB | 0x00 | 0x42 | 0x00 | 0x1B | 0xE0 | 0x35 | 0x00 |
| | | | | UID(LSB) | SA(MSB) | SA(LSB) | Len(MSB) |
| 0x00 | 0x00 | 0x00 | 0x00 | 0x01 | 0x00 | 0x00 | 0x00 |
| Len(LSB) | UD(MSB) | | | | | | |
| 0x0F | 0x46(F) | 0x4C(L) | 0x41(A) | 0x54(T) | 0x52(R) | 0x4F(O) | 0x4E(N) |
| | | | | | | | UD(LSB) |
| 0x20() | 0x4C(L) | 0x31(1) | 0x37(7) | 0x34(4) | 0x30(0) | 0x42(B) | 0x51(Q) |
| End Mark | | | | | | | |
| 0x7E | | | | | | | |

Fig. 60

| Preamble | Msg Type | Code | PL (MSB) | PL (LSB) | Arg | End Mark |
|---|---|---|---|---|---|---|
| 0xBB | 0x01 | 0x42 | 0x00 | 0x01 | 0x00 | 0x7E |

Fig. 61

| Preamble | Msg Type | Code | PL (MSB) | PL (LSB) | AP(MSB) | | |
|---|---|---|---|---|---|---|---|
| 0xBB | 0x00 | 0x43 | 0x00 | 0x24 | 0x87 | 0x65 | 0x43 |
| AP(LSB) | UL(MSB) | UL(LSB) | UII(MSB) | | | | |
| 0x21 | 0x00 | 0x0C | 0x30 | 0xF4 | 0x25 | 0x7B | 0xF4 |
| | | | | | UII(LSB) | SA (MSB) | |
| 0x62 | 0x5F | 0x80 | 0x00 | 0x00 | 0x00 | 0x01 | 0x00 |
| SA (LSB) | UDL(MSB) | UDL(LSB) | UD (MSB) | | | | |
| 0x | 0x00 | 0xE | 0x46 (F) | 0x4C (L) | 0x41 (A) | 0x54 (T) | 0x52 (R) |
| 0x4F (O) | 0x4E (N) | 0x20 ( ) | 0x4C (L) | 0x31 (1) | 0x37 (7) | 0x34 (4) | 0x30 (0) |
| UD(LSB) | End Mark | | | | | | |
| 0x42 (B) | 0x7E | | | | | | |

Fig. 62

| Preamble | Msg Type | Code | PL (MSB) | PL (LSB) | Arg | End Mark |
|---|---|---|---|---|---|---|
| 0xBB | 0x01 | 0x43 | 0x00 | 0x01 | 0x00 | 0x7E |

Fig. 63

| Preamble | Msg Type | Code | PL (MSB) | PL (LSB) | UID(MSB) | | |
|---|---|---|---|---|---|---|---|
| 0xBB | 0x00 | 0x44 | 0x00 | 0x1F | 0xE0 | 0x35 | 0x00 |
| | | | | UID(LSB) | ML(MSB) | | |
| 0x00 | 0x00 | 0x00 | 0x00 | 0x01 | 0x00 | 0x00 | 0x00 |
| | | ML(MSB) | UDL(MSB) | UDL(LSB) | UD (MSB) | | |
| 0x00 | 0x00 | 0x00 | 0x00 | 0x0F | 0x46 (F) | 0x4C (L) | 0x41 (A) |
| 0x54 (T) | 0x52 (R) | 0x4F (O) | 0x4E (N) | 0x20 ( ) | 0x4C (L) | 0x31 (1) | 0x37 (7) |
| | | | UD (LSB) | End Mark | | | |
| 0x34 (4) | 0x30 (0) | 0x42 (B) | 0x51 (Q) | 0x7E | | | |

Fig. 64

| Preamble | Msg Type | Code | PL (MSB) | PL (LSB) | Arg | End Mark |
|---|---|---|---|---|---|---|
| 0xBB | 0x01 | 0x44 | 0x00 | 0x01 | 0x00 | 0x7E |

Fig. 65

| Preamble | Msg Type | Code | PL (MSB) | PL (LSB) | AP(MSB) | | |
|---|---|---|---|---|---|---|---|
| 0xBB | 0x00 | 0x45 | 0x00 | 0x3D | 0x87 | 0x65 | 0x43 |
| AP(LSB) | UL(MSB) | UL(LSB) | UII(MSB) | | | | |
| 0x21 | 0x00 | 0x0C | 0x30 | 0xF4 | 0x25 | 0x7B | 0xF4 |
| | | | | | | UII(LSB) | NUL(MSB) |
| 0x62 | 0x5F | 0x80 | 0x00 | 0x00 | 0x00 | 0x01 | 0x00 |
| NUL(LSB) | NU(MSB) | | | | | | |
| 0x0C | 0x30 | 0xF4 | 0x25 | 0x7B | 0xF4 | 0x62 | 0x5F |
| | | | | NU (LSB) | PC(MSB) | PC(LSB) | UDL(MSB) |
| 0x80 | 0x00 | 0x00 | 0x00 | 0x02 | 0x20 | 0x00 | 0x00 |
| UDL(LSB) | UD(MSB) | | | | | | |
| 0x0E | 0x46(F) | 0x4C(L) | 0x41(A) | 0x54(T) | 0x52(R) | 0x4F(O) | 0x4E(N) |
| | | | | | | | RBL(MSB) |
| 0x20 ( ) | 0x4C (L) | 0x31 (1) | 0x37 (7) | 0x34 (4) | 0x30 (0) | 0x42 (B) | 0x00 |
| RBL(LSB) | RBD(MSB) | | | | | | |
| 0x08 | 0x12 | 0x34 | 0x56 | 0x78 | 0x87 | 0x65 | 0x43 |
| | End Mark | | | | | | |
| 0x21 | 0x7E | | | | | | |

Fig. 66

| Preamble | Msg Type | Code | PL (MSB) | PL (LSB) | Arg | End Mark |
|---|---|---|---|---|---|---|
| 0xBB | 0x01 | 0x45 | 0x00 | 0x01 | 0x00 | 0x7E |

Fig. 67

| Preamble | Msg Type | Code | PL (MSB) | PL (LSB) | AP(MSB) | | |
|---|---|---|---|---|---|---|---|
| 0xBB | 0x00 | 0x51 | 0x00 | 0x14 | 0x12 | 0x34 | 0x56 |
| AP(LSB) | KP(MSB) | | | KP(LSB) | UL(MSB) | UL(LSB) | UII(MSB) |
| 0x78 | 0x87 | 0x65 | 0x43 | 0x21 | 0x00 | 0x0C | 0x30 |
| 0xF4 | 0x25 | 0x7B | 0xF4 | 0x62 | 0x5F | 0x80 | 0x00 |
| | | UII(LSB) | End Mark | | | | |
| 0x00 | 0x00 | 0x01 | 0x7E | | | | |

Fig. 68

| Preamble | Msg Type | Code | PL (MSB) | PL (LSB) | Arg | End Mark |
|---|---|---|---|---|---|---|
| 0xBB | 0x01 | 0x61 | 0x00 | 0x01 | 0x00 | 0x7E |

Fig. 69

| Preamble | Msg Type | Code | PL (MSB) | PL (LSB) | UID(MSB) | | |
|---|---|---|---|---|---|---|---|
| 0xBB | 0x00 | 0x81 | 0x00 | 0x0D | 0xE0 | 0x35 | 0x00 |
| | | | | UID(LSB) | ADDR | End Mark | |
| 0x00 | 0x00 | 0x00 | 0x01 | 0x02 | 0x1D | 0x7E | |

Fig. 70

| Preamble | Msg Type | Code | PL (MSB) | PL (LSB) | Arg | End Mark |
|---|---|---|---|---|---|---|
| 0xBB | 0x01 | 0x81 | 0x00 | 0x01 | 0x00 | 0x7E |

Fig. 71

| Preamble | Msg Type | Code | PL (MSB) | PL (LSB) | AP(MSB) | | |
|---|---|---|---|---|---|---|---|
| 0xBB | 0x00 | 0x82 | 0x00 | 0x17 | 0x87 | 0x65 | 0x43 |
| AP(LSB) | UL(MSB) | UL(LSB) | UII(MSB) | | | | |
| 0x21 | 0x00 | 0x0C | 0x30 | 0xF4 | 0x25 | 0x7B | 0xF4 |
| | | | | | | UII(LSB) | RSV LD |
| 0x62 | 0x5F | 0x80 | 0x00 | 0x00 | 0x00 | 0x01 | 0000 0000 |
| | LD(LSB) | End Mark | | | | | |
| 0xC0 | 0x30 | 0x7E | | | | | |

Fig. 72

| Preamble | Msg Type | Code | PL (MSB) | PL (LSB) | Arg | End Mark |
|---|---|---|---|---|---|---|
| 0xBB | 0x01 | 0x82 | 0x00 | 0x01 | 0x00 | 0x7E |

Fig. 73

| Preamble | Msg Type | Code | PL (MSB) | PL (LSB) | End Mark |
|---|---|---|---|---|---|
| 0xBB | 0x00 | 0xA1 | 0x00 | 0x00 | 0x7E |

Fig. 74

| Preamble | Msg Type | Code | PL (MSB) | PL (LSB) | Arg | End Mark |
|---|---|---|---|---|---|---|
| 0xBB | 0x01 | 0xA1 | 0x00 | 0x01 | 0x09 | 0x7E |

Fig. 75

| Preamble | Msg Type | Code | PL (MSB) | PL (LSB) | End Mark |
|---|---|---|---|---|---|
| 0xBB | 0x00 | 0xA2 | 0x00 | 0x00 | 0x7E |

Fig. 76

| Preamble | Msg Type | Code | PL (MSB) | PL (LSB) | Arg | End Mark |
|---|---|---|---|---|---|---|
| 0xBB | 0x01 | 0xA2 | 0x00 | 0x01 | 0x00 | 0x7E |

Fig. 77

| Preamble | Msg Type | Code | PL (MSB) | PL (LSB) | End Mark |
|---|---|---|---|---|---|
| 0xBB | 0x00 | 0xA3 | 0x00 | 0x00 | 0x7E |

Fig. 78

| Preamble | Msg Type | Code | PL (MSB) | PL (LSB) | Arg | End Mark |
|---|---|---|---|---|---|---|
| 0xBB | 0x01 | 0xA3 | 0x00 | 0x01 | 0x00 | 0x7E |

Fig. 79

| Preamble | Msg Type | Code | PL (MSB) | PL (LSB) | End Mark |
|---|---|---|---|---|---|
| 0xBB | 0x00 | 0xA4 | 0x00 | 0x00 | 0x7E |

Fig. 80

| Preamble | Msg Type | Code | PL (MSB) | PL (LSB) | Arg | End Mark |
|---|---|---|---|---|---|---|
| 0xBB | 0x01 | 0xA4 | 0x00 | 0x01 | 0x00 | 0x7E |

Fig. 81

| Preamble | Msg Type | Code | PL (MSB) | PL (LSB) | End Mark |
|---|---|---|---|---|---|
| 0xBB | 0x00 | 0xA5 | 0x00 | 0x00 | 0x7E |

Fig. 82

| Preamble | Msg Type | Code | PL (MSB) | PL (LSB) | Arg(MSB) | | |
|---|---|---|---|---|---|---|---|
| 0xBB | 0x01 | 0xA5 | 0x00 | 0x04 | 0x00 | 0x01 | 0x86 |
| Arg(LSB) | End Mark | | | | | | |
| 0xA0 | 0x7E | | | | | | |

Fig. 83

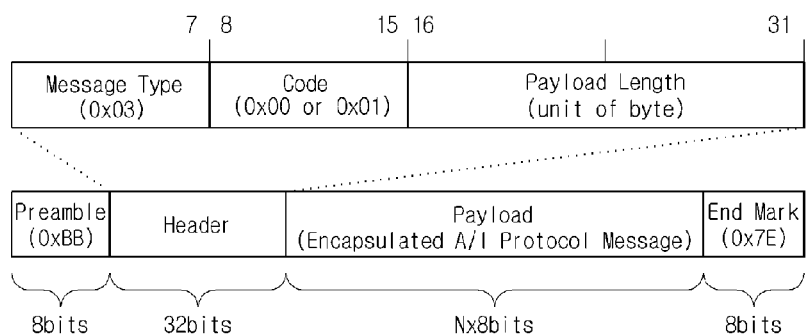

READER CONTROL SYSTEM

This present application is the national phase of PCT International Application No. PCT/KR2006/001564 filed on Apr. 25, 2006, which claims priority to U.S. Provisional Application Nos. 60/757,480 filed Jan. 10, 2006; 60/719,460 filed on Sep. 21, 2005; 60/689,784 filed on Jun. 9, 2005; and 60/674,765 filed on Apr. 25, 2005.

TECHNICAL FIELD

The present invention relates to a reader control system.

BACKGROUND ART

The ISO and EPC standards define a reader protocol that supports connection of an RFID reader to a host through a network. In RFID systems, an RFID reader is mounted on a mobile phone or attached to a mobile phone in a dongle configuration. Such RFID systems require a protocol that enables an RFID reader control unit of the mobile phone to control the RFID reader.

In mobile phone environments, an RFID system is employed between a processor (e.g., MPU and MCU) of a mobile phone and an RFID reader chip installed in the mobile phone. Alternatively, a reader protocol is employed between a mobile phone and an RFID reader attached onto the mobile phone in a dongle configuration. When an RFID reader is attached onto a mobile phone in a dongle configuration, the RFID reader and the mobile phone are connected by an interface unit such as UART or USB. In this case, an efficient protocol is needed between the RFID reader and the mobile phone.

The ISO and EPC standards provide protocols that are applied mainly for the case where an RFID reader is connected through a network. Therefore required is an RFID system including an RFID reader control protocol suitable for mobile phone environments.

DISCLOSURE OF INVENTION

Technical Problem

Accordingly, the present invention is directed to a reader control system that substantially obviates one or more problems due to limitations and disadvantages of the related art.

An object of the present invention is to provide a reader control system and method suitable for mobile terminal environments. In the system and method, a protocol for controlling a reader and a reader control unit of a mobile terminal is defined and messages, information, commands, responses, and notification are constructed and transmitted between the reader and the reader control unit.

Technical Solution

To achieve these objects and other advantages and in accordance with the purpose of the invention, as embodied and broadly described herein, there are provided commands and responses that are exchanged between a reader and a reader control unit such as a processor of a terminal.

In another aspect of the present invention, there are provided a reader control protocol format and respective fields that are used between a reader and a reader control unit such as a processor of a terminal.

In another aspect of the present invention, there are provided protocol messages, fields of each protocol message, and the content of each field, with respect to commands, responses, and notifications that are used in a reader control protocol that is performed between a reader and a reader control unit such as a processor of a terminal.

In a further aspect of the present invention, there is provided a method of using respective fields of a reader control protocol format that is exchanged between a reader and a reader control unit such as a processor of a terminal.

In a further aspect of the present invention, there is provided a method of constructing a message and information in a reader control protocol that is performed between a reader and a reader control unit such as a processor of a terminal.

In a further aspect of the present invention, there is provided a method of transmitting a message and/or information in a reader control protocol that is performed between a reader and a reader control unit such as a processor of a terminal.

In a further aspect of the present invention, there is provided a method of constructing and transmitting a protocol bit stream in a reader control protocol that is performed between a processor, a reader, and a reader control unit such as a processor of a terminal.

In a further aspect of the present invention, there is provided a method of constructing and storing a message and/or information in a reader control protocol that is performed between a processor, a reader, and a reader control unit such as a processor of a terminal.

In a further aspect of the present invention, there is provided a method of controlling and managing a reader in a reader control protocol that is performed between a processor, a reader, and a reader control unit such as a processor of a terminal.

In a further aspect of the present invention, there is provided a method of reading, writing, changing, querying, protecting, and killing (or deleting) a reader message and/or information in a reader control protocol that is performed between a processor, a reader, and a reader control unit such as a processor of a terminal.

In a further aspect of the present invention, there are provided a response and an error process to a message and/or information and the implementation and use method of additional functions, in a reader control protocol that is performed between a processor, a reader, and a reader control unit such as a processor of a terminal.

It is to be understood that both the foregoing general description and the following detailed description of the present invention are exemplary and explanatory and are intended to provide further explanation of the invention as claimed.

Advantageous Effects

According to the present invention, the present invention is directed a reader control system and method suitable for mobile terminal environments. In the system and method, a protocol for controlling a reader and a reader control unit of a mobile terminal is defined and messages, information, commands, responses, and notification are constructed and transmitted between the reader and the reader control unit.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4 through 6 illustrates a payload type according to an embodiment of the present invention; and FIGS. 7 through 83 illustrate mobile RFID reader control protocol message structures according to embodiments of the present invention.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the following embodiments of the present invention, a mobile terminal (e.g., a mobile phone) with an RFID reader control unit is taken as an example of a terminal with an RFID reader control unit.

Figure 1:
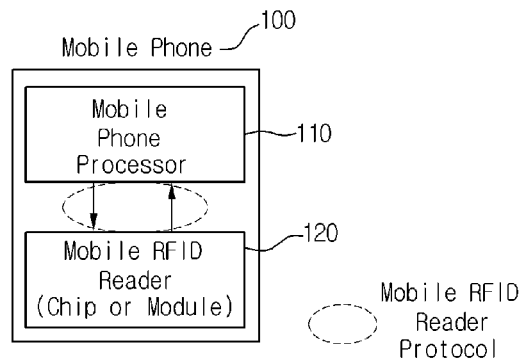
FIGS. 1 and 2 illustrate the configuration of mobile RFID systems to which the present invention is applied.
Figure 2:
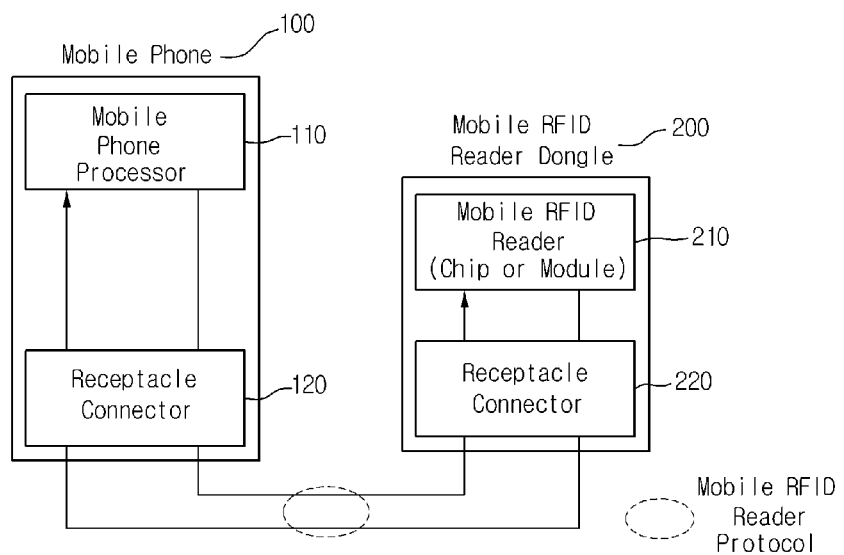

FIG. 1 illustrates a mobile RFID system configuration when a mobile RFID reader is installed in a mobile phone. FIG. 2 illustrates a mobile RFID system configuration when a mobile RFID reader is attached to the outside of a mobile phone in a dongle configuration.

Referring to FIG. 1, a mobile phone 100 includes a mobile phone processor 110 and a chip-type or module-type mobile RFID reader 120. The present invention proposes a mobile RFID reader control protocol executed between the processor 110 and the RFID reader 120.

Referring to FIG. 2, a mobile phone 100 includes a mobile phone processor 110 and a receptacle connector 120. A mobile RFID reader dongle 200 includes a chip-type or module-type mobile RFID reader 210 and a receptacle connector 220. The RFID reader 210 is connected to the mobile phone 100 by the receptacle connectors 120 and 220. The present invention proposes a mobile RFID reader control protocol executed between the processor 110 and the RFID reader 210.

Terms in the embodiments of the present invention are based on the MRF document 'Term Definition of Mobile RFID Service Standards'. For example, the term 'Q' is a parameter used in a tag based on the ISO 18000-6C standards. When a reader transmits the parameter Q to a tag, the tag generates $(2^Q-1)$ time slots and sends a response in synchronization with one of the $(2^Q-1)$ time slots.

[1] Format of Mobile RFID Reader Control Protocol

Figure 3:
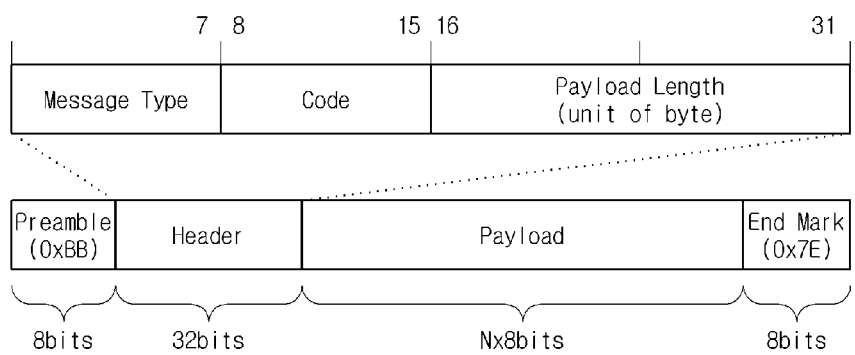
FIG. 3 illustrates a mobile RFID reader control protocol format according to an embodiment of the present invention.

A mobile RFID reader control protocol according to an embodiment of the present invention includes a preamble, a header, a payload, and an end mark. FIG. 3 illustrates a format of a mobile RFID reader control protocol according to an embodiment of the present invention. A preamble includes information for indicating the start of a protocol message, which is used to discern protocol messages. For example, the preamble may be configured in 8 bits and may have a value of 0xBB. A header includes information for indicating a message type, a corresponding code, and a payload length. That is, payload length information is stored in the header. Information received from an RFID tag is stored in the payload. An end mark includes information for indicating the end of a protocol message, which is used to discern protocol messages together with the preamble. For example, the end mark may be configured in 8 bits and may have a value of 0x7E.

[1.1] Preamble Field and End Mark Field

For example, in each protocol message, the preamble and the end mark each have a 8-bit data, which indicate the start and end of the protocol message. The preamble and the end mark are located at the start and end of the protocol message, respectively, and have a predetermined value. For example, the preamble may have a value of 0xBB, and the end mark may have a value of 0x7E. It is preferable that the preamble and the end mark have a different value than those used in a message type field and a code field of the header.

[1.2] Header Field

The header includes three fields describing an RFID tag type, command/response/notification type and code, and a payload length. The message type field is used to discern a command that is transmitted from the processor to the reader and a response and a notification that are transmitted from the reader to the processor. The code field is used to discern a variety of types of command, response or notification. Also, the code field includes information about success or failure of command in response and notification. The payload length field includes information indicating the length of a payload located right after the header, which represents the length in byte.

[1.2.1] Message Type Field

The message type field includes information about which one of a command, a response and a notification in a protocol format, which may be represented in a total of 8 bits. The message type (e.g., command, response and notification) can be discerned using values shown in Table 1 below.

TABLE 1

| Command/Response/<br>Notification Type | Corresponding Code Value<br>(Hexadecimal) |
| --- | --- |
| Command | 0x00 |
| Response | 0x01 |
| Notification | 0x02 |
| Test Mode | 0x03 |
| Reserved | 0x04-0xFF |

As shown in Table 1, a code value indicating a command is 0x00, a code value indicating a response is 0x01, a code value indicating a notification is 0x02, a code value indicating a test mode is 0x03, and code values indicating "Reserved" are 0x04~0xFF. The command, the response, the notification, and the test mode shown in Table 1 will be described in detail later.

[1.2.2] Code Field

A code field is used to discern the types of a command, a response, and a notification. There may be various commands to be processed by a mobile RFID reader. Also, there may be various responses to the commands and various notifications to be sent by the reader. Therefore, when a different code is assigned to each kind of command, response and notification, the reader can accurately discern them by referring to the message type field and the code field. For example, when a value 0x00 and a value 0x01 are respectively assigned to a message type field and a code field for a power control command, the reader can recognize a received command as the power control command by the assigned values.

[1.2.3] Payload Length Field

A payload length field indicates the length of a payload field located after a header field. The value of the payload length field includes the size of the payload itself and specifies the payload length in bytes. For example, the payload length field may be a 16-bit payload length field with the unit of the payload length being a byte. When a payload length is represented in bytes using 16 bits, the maximum representable length of the payloads becomes 65,536 bytes. This means that the payloads up to 65,535 bytes can be supported/indicated.

[1.3] Payload Field

Figure 4:
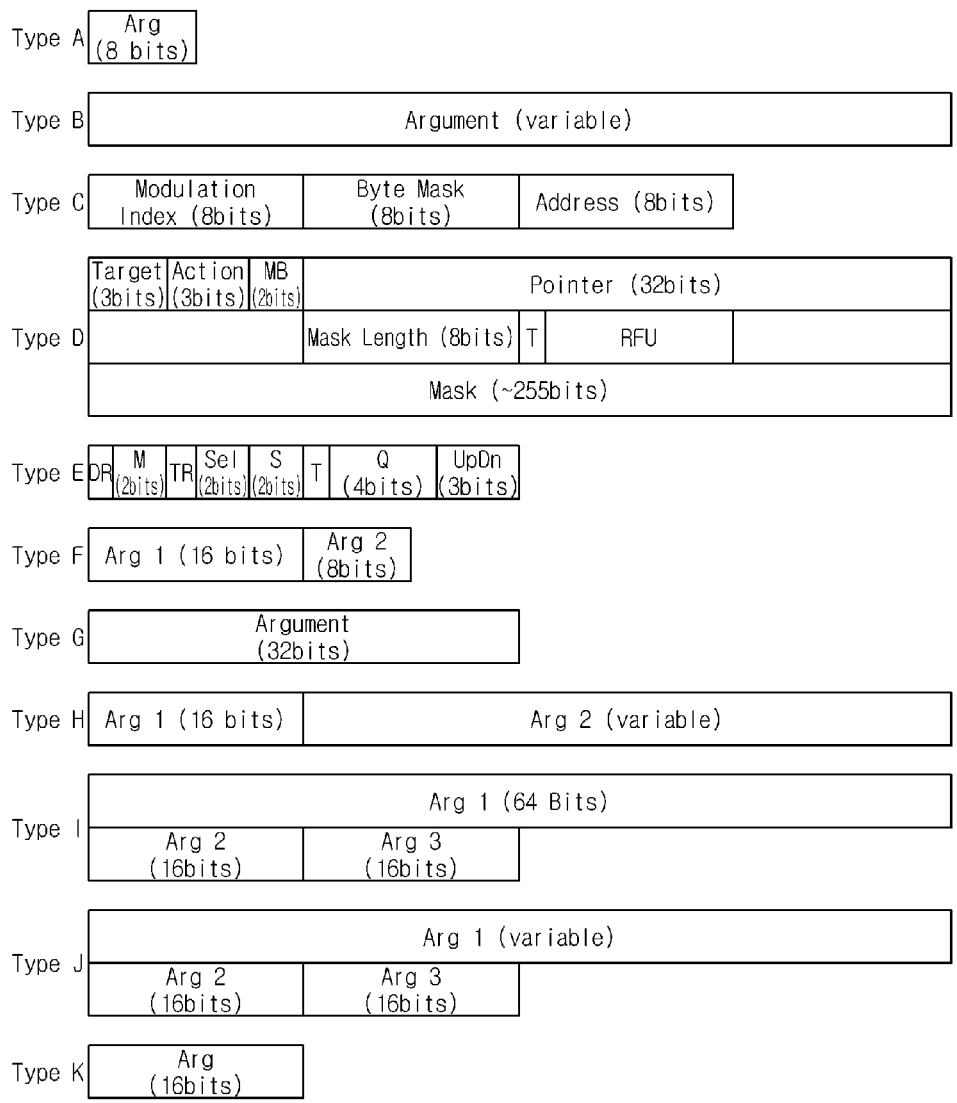

A payload field stores various types of data. The payload field may include arguments related to a command transmitted from the processor to the RFID reader, and various data contained in a response transmitted from the RFID reader to the processor. There may be various types of payloads suitable for respective commands and responses, such as payloads illustrated in FIGS. 4 through 6. FIGS. 4 through 6 illustrate Type A through Type X.

Each of the payloads illustrated in FIGS. 3 through 6 includes a specific field. The use of the specific field and the method thereof will be described in detail later. The generation and configuration of each payload type will now be described in detail. The number of bits and order mentioned in the following payload configurations are merely examples, and the present invention is not limited to this.

A payload Type A includes an 8-bit argument.

A payload Type B includes a variable-length argument.

A payload Type C is generated to include an 8-bit modulation index, an 8-bit byte mask, and an 8-bit address, which are transmitted in the order named.

A payload Type D includes a 3-bit target, a 3-bit action, a 2-bit MB, a 32-bit pointer, an 8-bit mask length, T, RFU (Reserved for Future Use), and a mask of maximum 25 bits, which are transmitted in the order named.

A payload Type E includes a 2-bit DR, a 4-bit M, a 2-bit TR, a 2-bit Sel, a 2-bit S, T, a 4-bit Q, and a 3-bit UpDn, which are transmitted in the order named.

A payload Type F includes a 16-bit argument 1 and an 8-bit argument 2, which are transmitted in the order named.

A payload Type G includes a 32-bit argument.

A payload Type H includes a 16-bit argument 1 and a variable-length argument 2, which are transmitted in the order named.

A payload Type I includes a 64-bit argument 1, a 16-bit argument 2, and a 16-bit argument 3, which are transmitted in the order named.

A payload Type J includes a variable-length argument 1, a 16-bit argument 2, and a 16-bit argument 3, which are transmitted in the order named.

A payload Type K includes a 16-bit argument.

A payload Type L includes a 64-bit UID, a 16-bit manufacturer, a 16-bit hardware type, a 48-bit memory layout, and a variable-length user data, which are transmitted in the order named.

A payload Type M includes a 64-bit UID, a 16-bit manufacturer, a 16-bit hardware type, an 8-bit EAC, an 8-bit AFID, an 8-bit SDF, an 8-bit USL, and an 8-bit ASL, which are transmitted in the order named.

A payload Type N includes a 16-bit TID bank length, a variable-length TID bank, a 16-bit UII (Unique Item Identifier) length, a 16-bit PC, a variable-length UII or UII set, and a variable-length user data, which are transmitted in the order named.

A payload Type O includes an 8-bit argument 1 and a 16-bit argument 2, which are transmitted in the order named.

A payload Type P includes a 32-bit access password, a 16-bit UII length, a variable-length UII, a 16-bit new UII length, a variable-length new UII, and a 16-bit PC, which are transmitted in the order named.

A payload Type Q includes a 64-bit UID, a 16-bit start address, a 16-bit length, and a variable-length user data, which are transmitted in the order named.

A payload Type R includes a 32-bit access password, a 16-bit UII length, a variable-length UII, a 16-bit start address, a 16-bit length, and a variable-length user data, which are transmitted in the order named.

A payload Type S includes a 64-bit UID, a 48-bit memory layout, a 16-bit user data length, and a variable-length user data, which are transmitted in the order named.

A payload Type T includes a 32-bit access password, a 16-bit UII length, a variable-length UII, a 16-bit new UII length, a variable-length new UII, a 16-bit PC, a 16-bit user data length, a variable-length user data, a variable-length reserved bank length, and a variable-length reserved bank data, which are transmitted in the order named.

A payload Type U includes a 32-bit access password, a 32-bit kill password, a 16-bit UII length, and a variable-length UII, which are transmitted in the order named.

A payload Type V includes a 64-bit UID and an 8-bit argument, which are transmitted in the order named.

A payload Type W includes a 32-bit access password, a 16-bit UII length, a variable-length UII, and a 24-bit lock data, which are transmitted in the order named.

A payload Type X includes a DR, a 2-bit M, TR, a 2-bit Sel, a 2-bit S, T, a 4-bit Q, and a 3-bit UpDn, which are transmitted in the order named.

The description of the foregoing payload types, the use of each field, and the use method thereof will be described in detail later.

[1.4] Endian Format and Transmission Order Format

All the fields constructing the mobile RFID reader control protocol format follow the big-Endian format. According to the big-Endian format, the most significant byte value is first written and then the least significant byte value is written. A preamble field, a header field, a payload field, and an end mark field are transmitted in the order named. In the header field, a message type field, a code field, and a payload length field are transmitted in the order named. In the payload field, a target field, an argument type field, a payload data length field, and a payload data and pending field are transmitted in the order named. In each field, the most significant byte is first transmitted.

[1.5] Method of Describing Small-Size Data in Fixed-Size Field

When a small-size data needs to be inserted into a protocol field larger than the small-sized data, the less significant bytes are first filled and then the remaining more significant bytes are filled with 0x00. In this case, the big-Endian format is also applied. For example, when a value of 12 needs to be inserted into a 16-bit length field, the less significant bytes are filed with 0x0C and the more significant bytes are filled with 0x00.

[2] Summary and List of Command, Response, and Notification

A protocol between a processor of a mobile terminal and an RFID reader can be classified into a command, a response, and a notification, which are defined in the ISO and EPC standards.

In the embodiment of the present invention, the command and the response always exist and operate in pairs. Only after a response to a command has been received, the next command is executed. Each command has a specific code, which is described in a code field of a header and represented in 8 bits. When a response is successful, a code of a corresponding command is described in a code field and a response-related content is described in a payload field. On the other hand, when a response is unsuccessful, a value of 0xFF is described in a code field and a result code is described in a payload field. A payload varies according to a command and a response. Detailed types of the payload will be described in detail later.

[2.1] Command and Response

In the embodiment of the present invention, commands and responses in a mobile RFID reader protocol are categorized into reader control/management, tag read, tag write, tag lock/unlock, tag kill, and additional functions. Table 2 below shows an example of a command list according to the present invention. In Table 2, the commands are classified into mandatory commands and optional commands. All the commands have the corresponding responses. Commands corresponding to a tag write category, a tag kill category, and a tag lock category must be implemented carefully. The reason for this is that such commands may change the contents of a tag. When these commands are wrongly used, security problems may occur to cause corresponding damages.

[2.2] Mobile RFID Reader Control/Management Category

An RFID reader control/management command category includes commands shown in Table 3 below. The main commands relate to reader power control, reader connection control, get reader information, reader RF signal strength control, and reader filter function control. The reader power control command and the reset reader command, which are the most basic reader control commands, may be directly controlled by a hardware interface such as GIPO. In this case, the foregoing two commands may not be implemented separately.

TABLE 2

| Type | Mandatory Command | Optional Command |
| --- | --- | --- |
| Readercontrol/management category | Reader Power ControlReader Connection ControlGet Reader InformationGet Signal StrengthSet Signal StrengthGet RegionSet RegionReset ReaderGet Type C A/I Select Parameters Set Type C A/I Select Parameters Get Type C A/I Query-related ParametersSet Type C A/I Query-related Parameters | Get Type B A/I Parameters Set Type B A/I ParametersGet Automatic Read ParametersSet Automatic Read Parameters |
| Tag ReadCategory | Read Type C UII BlockRead Type C User DataRead Entire Type C TagStart Automatic ReadStop Automatic Read | Read Type B TIDRead Type B User DataRead Entire Type B Tag |
| Tag WriteCategory | | Write Type B UII SetWrite Type C UII BlockWrite Type B User DataWrite Type C User DataWrite Entire Type B TagWrite Entire Type C Tag |
| Tag KillCategory | Kill Type C Tag | |
| Tag LockCategory | | Lock Type B TagLock Type C Tag |
| AdditionalFunction Category | Start Test ModeStop Test ModeStar Receive TestStop Receive Test | Get Last Result |

TABLE 3

| Command Name | Code Value (Hexadecimal) | Description of Command |
| --- | --- | --- |
| Reader Power Control | 0x01 | Power on/off reader (Active/Sleep) |
| Reader Connection Control | 0x02 | Initialize or end communication with reader |
| Get Reader Information | 0x03 | Get reader-related information (Reader at least have information about model, manufacturer, S/N, usable frequency, and supportable tag type) |
| Get Signal Strength | 0x04 | Get RF signal strength of reader |
| Set Signal Strength | 0x05 | Set RF signal strength of reader |
| Get Region | 0x06 | Get nation/region information of reader |
| Set Region | 0x07 | Set nation/region information of reader |
| Reset Reader | 0x08 | Immediately end all operations of reader and initialize reader. Thereafter, reader control requires using Reader connection control command |
| Get Type B A/I Parameters | 0x09 | Get air interface parameters related to Type B standard |
| Set Type B A/I Parameters | 0x0A | Set air interface parameters related to Type B standard |
| Get Type C A/I Select Parameters | 0x0B | Get select parameters of air interface related to Type C standard |
| Set Type C A/I Select Parameters | 0x0C | Set select parameters of air interface related to Type C standard |
| Get Type C A/I | 0x0D | Get query-related parameters of air interface |

TABLE 3-continued

| Command Name | Code Value (Hexadecimal) | Description of Command |
|---|---|---|
| Query related Parameters | | related to Type C standard |
| Set Type C A/I Query related Parameters | 0x0E | Set query-related parameters of air interface related to Type C standard |
| Get Automatic read Parameters | 0x0F | Get parameters related to automatic mode read |
| Set Automatic read Parameters | 0x10 | Set parameters related to automatic mode read |
| Vendor Specific | 0x11-0x17 | Vendor can be defined |
| Reserved | 0x18-0x1F | reserved |

Referring to Table 3, the reader control/management category includes a get automatic read parameters command and a set automatic read parameters command for getting and setting commands related to an automatic read command. These commands operate according to preset parameters. These preset parameters include a read cycle indicating the number of times of performance of a read operation, and also include a read delay time indicating a delay time between read operations when the reader performs a read operation more than two times.

[2.3] Tag Read Category

A tag read category includes commands shown in Table 4 below. These commands are mainly used to read the specific ID of a tag (TID), a UII set (e.g., mCodes of MRF and EPC codes indicating things), and a user memory bank area.

TABLE 4

| Command Name | Code Value (Hexadecimal) | Description of Command |
|---|---|---|
| Read Type B TID | 0x21 | Read 8th through 16th address values and TID of ISO 18000-6B Tag |
| Read Type C UII Block | 0x22 | Read UII block of ISO 18000-6C Tag (UII or UII Set and PC are readed) |
| Read Type B User Data | 0x23 | Read user memory bank of ISO 18000-6B Tag |
| Read Type C User data | 0x24 | Read user memory bank of ISO 18000-6C Tag |
| Read Entire Type B Tag | 0x25 | Read all area of ISO 18000-6B Tag |
| Read Entire Type C Tag | 0x26 | Read all area of ISO 18000-6C Tag |
| Start Automatic Read | 0x27 | Perform automatic mode read operation (applicable to the above 6 commands) |
| Stop Automatic Read | 0x28 | Stop automatic mode read operation |
| Vendor Specific | 0x29-0x37 | Vendor can be defined |
| Reserved | | reserved |

Referring to Table 4, the tag read category further includes commands for automatically reading a plurality of successive tags. The commands related to the automatic read operation include a start automatic read command and a stop automatic read command.

The start automatic read command is configured to designate codes (0x21~0x26) of read commands to be repeated and a repeat cycle, which indicates which number of times a read operation of a read cycle designated in the set automatic read parameters command needs to be repeated. That is, the total number of times of a read operation of the RFID reader equals Read cycle×Repeat cycle. When a repeat cycle is an invalid value, a response indicating a wrong value is generated in a result code. When a read operation has been performed by the repeat cycle or there is no tag to be read, the RFID reader automatically stops a read operation.

The stop automatic read command is used to stop the read operation that is being performed by the start automatic read command.

Most commands cannot be executed during the automatic read operation. If such a command is to be executed, the command is regarded as failed and the result code receives 0x0D of Automatic Read in Operation. Examples of commands executable during the automatic read operation are reset reader, get signal strength, set signal strength, and stop automatic read.

Data obtained from an RFID tag by a tag read command are transmitted to the processor of the terminal through a notification or a response to a command. In the embodiment of the present invention, a buffer function of storing data obtained from a tag by a reader chip is set to be optional. However, when the buffer function needs to be implemented, a vendor-specific command code area of the additional function category must be used and the implementation must be based on the HAL API standards.

[2.4] Tag Write Category

A tag write category includes commands shown in Table 5 below. These commands are used to write an ID code, a user memory bank area, and additional information in the tag.

TABLE 5

| Command Name | Code Value (Hexadecimal) | Description of Command |
|---|---|---|
| Write Type C UII Block | 0x41 | Write UII block of ISO 18000-6C Tag (UII set, PC and CRC values must be written) |
| Write Type B User Data | 0x42 | Write user memory bank area of ISO 18000-6B Tag |
| Write Type C User Data | 0x43 | Write user memory bank area of ISO 18000-6C Tag |
| Write Entire Type B Tag | 0x44 | Write entire content of ISO 18000-6B Tag |
| Write Entire Type C Tag | 0x45 | Write entire content of ISO 18000-6C Tag |
| Vendor Specific | 0x46-0x57 | Vendor can be defined |
| Reserved | 0x58-0x5F | reserved |

[2.5] Tag Kill Category

A tag kill category includes commands shown in Table 6 below. These commands are used to kill (erase) the contents of a tag.

TABLE 6

| Command Name | Code Value (Hexadecimal) | Description of Command |
|---|---|---|
| Kill Type c Tag | 0x61 | Kill Type C Tag |
| Vendor Specific | 0x62-0x77 | Vendor can be defined |
| Reserved | 0x78-0x7F | reserved |

[2.6] Tag Lock Control Category

A tag lock control category includes commands for controlling a lock function for preventing the contents of a tag to be changed or erased, which are shown in Table 7 below.

TABLE 7

| Command Name | Code Value (Hexadecimal) | Description of Command |
|---|---|---|
| Lock Type B Tag | 0x81 | Control lock of ISO1800-6B Tag |
| Lock Type C Tag | 0x82 | Control lock of ISO 1800-6C Tag |
| Vendor Specific | 0x83-0x97 | Vendor can be defined |
| Reserved | 0x98-0x9F | reserved |

A lock command is configured such that different commands are assigned to tags. Also, arguments necessary for the lock command are based on the air interface standards.

[2.7] Additional Function Category

An additional function category includes commands for additional functions, which are shown in Table 8 below.

TABLE 8

| Command Name | Code Value (Hexadecimal) | Description of Command |
|---|---|---|
| Get Last Result | 0xA1 | Reader gets the last event |
| Stat Test Mode | 0xA2 | Convert mode of reader into test mode |
| Stop Test Mode | 0xA3 | Stop test mode of reader |
| Stat Receive Test | 0xA4 | Start count of successfully-received air interface packet to measure receive sensitivity |
| Stop Receive Test | 0xA5 | Stop count of successfully-received air interface packet for measurement of receive sensitivity |
| Vendor Specific | 0xA6-0xB7 | Vendor can be defined |
| Reserved | 0xB8-0xFE | reserved |

The additional function category includes convenience-providing functions other than basic contents for processing a tag by the reader. These include a filter function of the reader and commands for getting and setting the tag access status of the reader. The additional function category further includes commands for starting or ending a test mode. A start receive test command and a stop receive test command for measurement of receive sensitivity can be used only in the test mode. The test mode will be described in detail later.

[2.8] Result Code

A result code is used for a response to a command. The result code indicates results of both success and failure. For the case of Success, a code value of a corresponding command is inserted into the code field of the header of a response protocol message. For the case of Failure, a value of 0xFF is inserted. Also, an 8-bit result code is inserted into a payload data section. This facilitates discrimination between contents of errors when commands are incorrectly executed. A result code 0x00 indicates success, which is used in case that no separate result value exists when a command is successful. Table 9 below illustrates the types of results and corresponding codes.

TABLE 9

| Error Type | Error Code | Description |
|---|---|---|
| Success | 0x00 | Indicates success of command |
| Power Control Failure | 0x01 | Power control on/off operation is failed |
| Connection control Failure | 0x02 | Connection control operation is failed |
| Cannot Get Reader Info | 0x03 | Reader ID cannot be set or got |
| Cannot Get Signal Strength | 0x04 | Signal strength cannot be got |
| Signal Strength Control Failure | 0x05 | Signal strength cannot be set |

TABLE 9-continued

| Error Type | Error Code | Description |
|---|---|---|
| Reader Filter Control Failure | 0x06 | Reader Filter cannot be control |
| Cannot Get Region | 0x07 | Region information of reader cannot be got |
| Region control Failure | 0x08 | Region of reader cannot be set |
| Read Failure | 0x09 | Read operation is failed |
| Automatic Read Failure | 0x0A | Automatic mode read operation is failed |
| Automatic Read in Operation | 0x0B | Automatic read is already in operation |
| Cannot Stop Automatic Read | 0x0C | Automatic mode read cannot be stopped |
| Not in Automatic Mode | 0x0D | Automatic read is not in operation |
| Invalid Parameter | 0x0E | Parameter is invalid |
| Cannot Get Automatic Parameters | 0x0F | Automatic mode parameters cannot be got |
| Write Failure | 0x10 | Write operation is failed |
| Erasure Failure | 0x11 | Erase operation is failed |
| Kill Failure | 0x12 | Kill operation is failed |
| Lock Control Failure | 0x13 | Lock operation is failed |
| Cannot Get Last Result | 0x14 | Last event cannot be got |
| No Tag Detected | 0x15 | No tag is detected |
| Password not Match | 0x16 | Password does not match |
| Not Supported Command | 0x17 | Command is not supported |
| Undefined command | 0x18 | Command is not defined |
| Cannot Reset Reader | 0x19 | Reader cannot be reset |
| Cannot Control Type B A/I Parameters | 0x1A | Air interface parameters related to Type B standard cannot be set or got |
| Cannot Control Type C A/I Parameters | 0x1B | Air interface parameters related to Type C standard cannot be set or got |
| No User Data | 0x1C | User memory bank does not exist |
| Reader is not in Test Mode | 0x1D | Reader is not in current test mode |
| Test Mode Control Failure | 0x1E | Test mode control is failed |
| Automatic Read Complete | 0x1F | Automatic read is completed |
| No more Tags to Read | 0x20 | No more tags remain to be red |
| Vendor Specific | 0x30-0xDF | |
| Reserved | 0xE0-0xFF | |

[2.9] Vendor-Specific Command and Response

In addition to the commands proposed in the present invention, vendor-specific commands of an RFID reader manufacturer may be further included in all the categories described above. Preferably, these vendor-specific commands use code values of a vendor-specific area in accordance with the categories proposed in the present invention. For example, when a specific command corresponding to a tag read function needs to be added, it preferably uses a code value of 0x29~0x37 that is a vendor-specific area of a tag read category.

[2.10] Notification

A notification is a protocol message that is transmitted from the RFID reader to the processor of the terminal. Unlike a response message, the notification protocol message is independent of a command. The notification is mainly used as a response for indicating a result for an operation repeated in an automatic mode, and is used for critical errors generated in the RFID reader.

In the embodiment of the present invention, the notification protocol message may have the same format as the response protocol message. However, for example, a value of 0x02 may be used in a message type field to discriminate the notification protocol message from the response protocol message.

In addition, when a critical error is generated in the reader, the notification may be used to inform the processor of the error. In this case, a format may be identical to that of a command containing the error, which is identical to what is designated as a notification in a message type field. The critical errors are not defined in the present invention, but may be those defined by a vendor. An error that needs to be transmitted by a notification may be defined using a vendor-specific area of a result code.

[2.11] Compatibility with HAL API Standards

Tables 10 and 11 below show relationships between commands defined in the HAL API standards and the mobile reader protocol commands proposed in the present invention. One HAL API command may correspond to several of the mobile reader protocol commands, and vice versa. A driver must be implemented in accordance with the relationships.

For example, a MH_rfidReportReaderStatus command is implemented using a considerably large number of mobile reader protocol commands. In this case, the implemented is preferably made by including a status parameter in the driver. When the results of a performed mobile reader protocol are stored in the status parameter, it is possible to reduce the number of reader protocol commands that needs to be performed when the MH_rfidReportReaderStatus command is received. In addition, since a return value for an HAL API function must be given, the corresponding results must be stored in the status parameter.

Among the HAL API commands, commands related to control of a buffer and management of a filter may be selectively implemented. The present invention assumes that the buffer and the filter may exist in any one of the HAL or the mobile reader chip. Accordingly, in order to implement a buffer function or a filter function in a reader chip, a mobile reader protocol command must be implemented such that the relationship with an HAL API command is proper. In this case, the mobile reader protocol may use a code value of a vendor-specific command field.

TABLE 10

| Type | HAL API Standard Command | Mobile Reader Protocol Standard Command |
|---|---|---|
| Reader Control | MH_rfidPowerOnMH_rfid PowerOffMH_rfidOpenReader- MH_rfidCloseReader- MH_rfidResetReaderMH_rfid- SetRegionMH_rfidGetRegion- MH_rfidSetRFStrength- MH_rfidGetRFStrength- MH_rfidGetManufacturer- MH_rfidGetModelMH_rfid- isOpenReaderMH_rfidisBusy- ReaderMH_rfidSetQMH_rfid- GetQMH_rfidSetRead- CycleMH_rfidGetReadCycle- MH_rfidSetReadDelay- timeMH_rfidGetReadDelay- time | Reader Power ControlReader Power Control Reader Connection ControlReader Connection controlReset ReaderReader Connection ControlSet RegionGet RegionSet Signal StrengthGet Signal StrengthGet Reader InfoGet Reader InfoProcess in driver: Response to Reader Connection ControlProcess in driver: Check of automatic reading or notSet Type C A/I Query Related ParametersGet Type C A/I Query Related ParametersSet Automatic Read ParametersGet Automatic Read ParametersSet Automatic Read ParametersGet Automatic Read Parameters |

TABLE 11

| Type | HAL API Standard Command | Mobile Reader Protocol Standard Command |
|---|---|---|
| TagControl | MH_rfidReadTIDCMH_rfid- ReadUIISetCMH_rfidReadUII- BlockCMH_rfidReadUserData- CMH_rfidStopReadMH_rfid- ReadUIISetBMH_rfidRead- UserDataBMH_rfidWriteUser- DataBMH_rfidLockBMH_rfid- WriteUIISetCMH_rfidWrite- UIIBlockCMH_rfidWriteUser- DataCMH_rfidLockCMH_rfid- UnlockCMH_rfidKillTagC | Read Type C UII BlockRead Type C UII BlockRead Type C UII BlockRead Type C User DataStop Automatic ReadRead Type B User DataRead Type B User DataWrite Type B User DataLock Type B TagWrite Type C UII BlockWrite Type C UII BlockWrite Type C User DataLock Type C TagLock Type C TagKill Type C Tag |
| BufferControl | MH_rfidCreateBufferMH_rfid- DestroyBufferMH_rfidRead- BufferMH_rfidWriteBufferMH_rfid- DeleteBufferMH_rfid- ClearBufferMH_rfidGetNum- BufferMH_rfidGetMaxNum- BufferMH_rfidSortBufferMH_rfid- ValidateBuffer | Cannot be supported by mobile reader protocol but can be implemented in vendor- specific fashion |
| FilterControl | MH_rfidAddFilterMH_rfidDelete- FilterMH_rfidEnableFilter- MH_rfidDisableFilter | Cannot be supported by mobile reader protocol but can be implemented in vendor- specific fashion |
| StatusReport | MH_rfidReportReaderStatus | Process in reader: Status parameters are stored and processed in case of Power and OpenGet Automatic Read ParametersGet RegionGet Signal StrengthGet Reader Information Get Type C A/I Query Related Parameters |

[3] Details of Command, Response, and Notification

This section [3] describes details of the commands, the responses, and the notifications that are stated above. The following descriptions illustrate arguments needed by the commands and the responses, their types, and notifications. Also illustrated are the relationship between the abovementioned protocol format and the command/response/the notification, and protocol streams for representing them.

[3.1] Reader Control/Management Category

[3.1.2] Reader Power Control

A reader power control command is used to control turning on/off power supplied to the hardware of the RFID reader. Power is supplied to the reader in the on state, while no power is supplied to the reader in the off state.

The reader power control command is constructed to include a message type, a code, a payload type, and an argument. The message type may be represented by 0x00 indicating a command. The code may be represented by 0x01 indicating reader power control. The payload type may be represented by Payload Type A. The argument is 8-bit power state information, which may be represented by 0xFF in an on state and by 0x00 in an off state.

FIG. 7 illustrates the structure of a protocol message in a power on state. Specifically, FIG. 7 illustrates values of a preamble field, a message type field, a code field, a payload field MSB, a payload field LSB, an argument field, and an end mark field.

A response to the reader power control command is constructed to include a message type, a code, a payload type, and an argument. The message type may be represented by 0x01 indicating a response. The code may be represented by 0x01 for the case of Success, and by 0xFF for the case of Failure. The payload type may be represented by Payload Type A. The argument may be represented by a result code 0x00 indicating success and by a result code 0x01 indicating power control failure.

FIG. 8 illustrates the structure of a protocol message for a reader power control response for the case of Success. Specifically, FIG. 8 illustrates values of a preamble field, a message type field, a code field, a payload field MSB, a payload field LSB, an argument field, and an end mark field.

[3.1.2] Reader Connection Control

A reader connection control command is used to connect/disconnect the processor to/from the reader. When the processor is connected to the reader, the reader can receive and process all commands. On the other hand, when the processor is disconnected from the reader, the reader can process only power/connection control commands. When the reader was supplied with power but cannot be connected, the minimum power is supplied.

The reader connection control command is constructed to include a message type, a code, a payload type, and an argument. The message type may be represented by 0x00 indicating a command. The code may be represented by 0x02 indicating reader connection control. The payload type may be represented by Payload Type A. The argument is 8-bit reader connection state information, which may be represented by 0xFF in case of connection and by 0x00 in case of disconnection.

FIG. 9 illustrates the structure of a protocol message in a connection state. Specifically, FIG. 9 illustrates values of a preamble field, a message type field, a code field, a payload field MSB, a payload field LSB, an argument field, and an end mark field.

A response to the reader connection control command is constructed to include a message type, a code, a payload type, and an argument. The message type may be represented by 0x01 indicating a response. The code may be represented by 0x02 in case of Success, and by 0xFF in case of Failure. The payload type may be represented by Payload Type A. The argument may be represented by a result code 0x00 indicating success and by a result code 0x02 indicating Connection Control Failure.

FIG. 10 illustrates the structure of a protocol message for a reader connection control response for the case of Success. Specifically, FIG. 10 illustrates values of a preamble field, a message type field, a code field, a payload field MSB, a payload field LSB, an argument field, and an end mark field.

[3.1.3] Command for Getting Information of the Reader (Get Reader Information)

A get reader Information command is used to get information from the reader. The information includes a model name, an S/N, a manufacturer, a use frequency, and the type of a tag supported.

The get reader information control command is constructed to include a message type, a code, a payload type, and an argument. The message type may be represented by 0x00 indicating a command. The code may be represented by 0x03 indicating the get reader information command. The payload type may be represented by Payload Type A. The argument is an 8-bit information type data indicating the type of information to be requested from the reader, which may include a reader model name (0x00), a reader S/N (0x01), a reader manufacturer (0x02), a reader use frequency (0x03), and the type (0x04) of a tag supported by the reader.

FIG. 11 illustrates the structure of a protocol message when the reader manufacturer is requested. Specifically, FIG. 11 illustrates values of a preamble field, a message type field, a code field, a payload field MSB, a payload field LSB, an argument field, and an end mark field.

A response to the get reader information command is constructed to include a message type, a code, a payload type, and an argument. The message type may be represented by 0x01 indicating a response. The code may be represented by 0x03 in case of Success, and by 0xFF in case of Failure. The payload type may be represented by Payload Type B in case of model name, S/N, manufacturer and frequency, by Payload Type A in case of the tag type supported by the reader, and by Payload Type A in case of command failure. The argument may be represented by a variable-length corresponding string in case of model name, S/N, manufacturer and frequency, by an 8-bit value 00000001 (ISO 18000-6B) or 00000010 (ISO 18000-6C) in case of the tag type supported by the reader, by 'Bit OR' in case of supporting plurality, and by a result code 0x03 indicating Cannot Get Reader Info in case of command failure.

FIG. 12 illustrates the structure of a protocol message for a get reader information response when the manufacture is 'LC ELECTRONICS'. Specifically, FIG. 12 illustrates values of a preamble field, a message type field, a code field, a payload field MSB, a payload field LSB, an argument field, and an end mark field. FIG. 13 illustrates a response when the tag type supported by the reader is 18000-B/C.

[3.1.4] Command for Getting an RF Signal Strength of the Reader (Get Signal Strength)

A get signal strength command is used to get a currently-set RF signal strength of an RFID reader. The signal strength can be represented in percentage, and the maximum signal strength the reader can provide can be regarded as 100%.

The get signal strength command includes a message type and a code, but does not include a payload type and an argument. The message type may be represented by 0x00 indicating a command. The code may be represented by 0x04 indicating Get Signal Strength.

FIG. 14 illustrates the structure of a protocol message for a get signal strength command. Specifically, FIG. 14 illustrates values of a preamble field, a message type field, a code field, a payload field MSB, a payload field LSB, and an end mark field.

A response to the get signal strength command is constructed to include a message type, a code, a payload type, and an argument. The message type may be represented by 0x01 indicating a response. The code may be represented by 0x04 in case of Success, and by 0xFF in case of Failure. The payload type may be represented by Payload Type A. The argument may be represented by 0~100 (0x00~0x64) indicating the signal strength in percentage, and by a result code 0x04 indicating Cannot Get Signal Strength.

FIG. 15 illustrates the structure of a protocol message for a Get Signal Strength response for the case of Success when the signal strength is 75%. Specifically, FIG. 15 illustrates values of a preamble field, a message type field, a code field, a payload field MSB, a payload field LSB, an argument field, and an end mark field.

[3.1.5] Command for Setting an RF Signal Strength of the Reader (Set Signal Strength)

A set signal strength command is used to set an RF signal strength of the reader. The signal strength can be represented in percentage, and the maximum signal strength the reader can provide can be regarded as 100%.

The set signal strength command includes a message type, a code, a payload type, and an argument. The message type may be represented by 0x0 indicating a command. The code may be represented by 0x05 indicating Set Signal Strength. The payload type may be represented by Payload Type A. The argument may be represented by 0x00~0x64 (0~100) indicating an 8-bit signal strength value.

FIG. 16 illustrates the structure of a protocol message for a set signal strength command when the signal strength is 50%. Specifically, FIG. 16 illustrates values of a preamble field, a message type field, a code field, a payload field MSB, a payload field LSB, an argument field, and an end mark field.

A response to the set signal strength command is constructed to include a message type, a code, a payload type, and an argument. The message type may be represented by 0x01 indicating a response. The code may be represented by 0x05 in case of Success, and by 0xFF in case of Failure. The payload type may be represented by Payload Type A. The argument may be represented by a result code 0x00 indicating success, and by a result code 0x04 indicating Signal Strength Control Failure.

FIG. 17 illustrates the structure of a protocol message for a get Signal Strength response for the case of Success. Specifically, FIG. 17 illustrates values of a preamble field, a message type field, a code field, a payload field MSB, a payload field LSB, an argument field, and an end mark field.

[3.1.6] Command for Getting Region/Nation Information Set in the Reader (Get Region)

A get region command is used to get region/nation information set in the reader. That is, since the radio wave standard the RFID reader can use is different according to nations and regions, the get region command is used to get such region/nation information.

The get region command includes a message type and a code, but does not include a payload type and an argument. The message type may be represented by 0x00 indicating a command. The code may be represented by 0x06 indicating Get Region.

FIG. 18 illustrates the structure of a protocol message for the get region command. Specifically, FIG. 18 illustrates values of a preamble field, a message type field, a code field, a payload field MSB, a payload field LSB, and an end mark field.

A response to the get region command is constructed to include a message type, a code, a payload type, and an argument. The message type may be represented by 0x01 indicating a response. The code may be represented by 0x06 in case of Success, and by 0xFF in case of Failure. The payload type may be represented by Payload Type A. The argument may be represented by an 8-bit value indicating a region or a nation set in the reader, and by a result code 0x07 indicating Cannot Get Region. For example, Korea, America, Europe, Japan, and China may be represented by 0x01, 0x02, 0x04, 0x08, and 0x10, respectively.

FIG. 19 illustrates the structure of a protocol message for a get region response when a region set in the reader is Korea. Specifically, FIG. 19 illustrates values of a preamble field, a message type field, a code field, a payload field MSB, a payload field LSB, an argument field, and an end mark field.

[3.1.7] Command for Setting Region/Nation Information in the Reader (Set Region)

A set region command is used to set region/nation information in the reader. That is, since the radio wave standard the RFID reader can use is different according to nations and regions, the set region command is used to set such region/nation information.

The set region command includes a message type, a code, a payload type, and an argument. The message type may be represented by 0x00 indicating a command. The code may be represented by 0x07 indicating Set Region. The payload type may be represented by an 8-bit value indicating a region set in the reader, which is identical to that of Get Region.

FIG. 20 illustrates the structure of a protocol message for the set region command when a nation set in the reader is Korea, which may include values of a preamble field, a message type field, a code field, a payload field MSB, a payload field LSB, an argument field, and an end mark field.

A response to the set region command is constructed to include a message type, a code, a payload type, and an argument. The message type may be represented by 0x01 indicating a response. The code may be represented by 0x07 in case of Success, and by 0xFF in case of Failure. The payload type may be represented by Payload Type A. The argument may be represented by a result code 0x00 indicating success and by a result code 0x08 indicating Region Control Failure.

FIG. 21 illustrates the structure of a protocol message for a set region response when a region set in the reader is Korea. Specifically, FIG. 21 illustrates values of a preamble field, a message type field, a code field, a payload field MSB, a payload field LSB, an argument field, and an end mark field.

[3.1.8] Reset Reader

A reset reader command is used to promptly stop all operations of the reader and initialize the reader. Upon completion of the initialization, a response to the reset reader command is transmitted to the reader. Right after execution of the reset reader command, the aforementioned reader connection control command must be used to connect the reader since the reader is initialized to a state where only power is supplied.

The reset reader command includes a message type and a code, but does not include a payload and an argument. The message type may be represented by 0x00 indicating a command. The code may be represented by 0x08 indicating Reset Reader.

FIG. 22 illustrates the structure of a protocol message for the reset reader command, which may include values of a preamble field, a message type field, a code field, a payload field MSB, a payload field LSB, and an end mark field. A response to the reset reader command is constructed to include a message type, a code, a payload type, and an argument. The message type may be represented by 0x01 indicating a response. The code may be represented by 0x08 in case of Success, and by 0xFF in case of Failure. The payload type may be represented by Payload Type A. The argument may be represented by a result code 0x00 indicating success and by a result code 0x19 indicating Cannot Reset Reader.

FIG. 23 illustrates the structure of a protocol message for a response to the reset reader command in case of Success. Specifically, FIG. 23 illustrates values of a preamble field, a message type field, a code field, a payload field MSB, a payload field LSB, an argument field, and an end mark field.

[3.1.9] Command for Getting Air Interface Parameters (Get Type B A/I Parameters)

A get type B A/I parameters command is used to get air interface (A/I) parameters related to the ISO 18000-6B standards. For example, these A/I parameters may be an modulation index (MI), a byte mask (BM), and an address. The get type B A/I parameters command includes a message type and a code, but does not include a payload type and an argument. The message type may be represented by 0x00 indicating a command. The code may be represented by 0x09 indicating Get Type B A/I Parameters. FIG. 24 illustrates the structure of a protocol message for the get type B A/I parameters command, which includes values of a preamble field, a message type field, a code field, a payload field MSB, a payload field LSB, an argument, and an end mark field.

A response to the get type B A/I parameters command is constructed to include a message type, a code, a payload type, and an argument. The message type may be represented by 0x01 indicating a response. The code may be represented by 0x09 in case of Success, and by 0xFF in case of Failure. The payload type may be represented by Payload Type C in case of Success, and by Payload Type A in case of Failure.

In case of Success, the argument represents a modulation index, a byte mask, and an address. The modulation index may be represented by an 8-bit value, which determines the ISO 18000-6B modulation scheme. That is, MI=18% (0x00), MI=100% (0xFF), and the like are represented. The byte mask may be represented by an 8-bit value, which is an 8-bit byte mask value defined in the ISO 18000-6B standards to determine which bit of one byte is compared. The address may be represented by an 8-bit value, which is an address defined in the ISO 18000-6B standards to determine which portion of a tag is compared. In case of Failure, the address may be represented by a result code 0x1A indicating Cannot Control Type B A/I Parameters and a result code 0x17 indicating Not Supported Command.

FIG. 25 illustrates the structure of a response protocol message for the get type B A/I parameters command. Here, MI=18%, BM=0xFF, and Address=0xFF.

[3.1.10] Command for Setting A/I Parameters (Set Type B A/I Parameters)

A set type B A/I parameters command is used to A/I parameters related to the ISO 18000-6B standards. The set type B A/I parameters command includes a message type, a code, a payload type, and an argument. The message type may be represented by 0x00 indicating a command. The code may be represented by 0x0A indicating Set Type B A/I Parameters. The payload type may be represented by Payload Type C.

The argument represents a modulation index, a byte mask, and an address. The modulation index may be represented by an 8-bit value, which determines the ISO 18000-6B modulation scheme. That is, MI=18% (0x00), MI=100% (0xFF), and the like are represented. The byte mask may be represented by an 8-bit value, which is an 8-bit byte mask value defined in the ISO 18000-6B standards to determine which bit of one byte is compared. The address may be represented by an 8-bit value, which is an address defined in the ISO 18000-6B standards to determine which portion of a tag is compared.

FIG. 26 illustrates the structure of a protocol message for the set type B A/I parameters command, wherein MI=18%, BM=0xFF, and Address=0xFF.

A response to the set type B A/I parameters command includes a message type, a code, a payload type, and an argument. The message type may be represented by 0x01 indicating a response. The code may be represented by 0x0A in case of Success, and by 0xFF in case of Failure. The payload type may be represented by Payload Type A.

The argument may be represented by a result code 0x00 in case of Success, by a result code 0x1A in case of Cannot Control Type B A/I Parameters, and by 0x17 in case of Not Supported Command.

FIG. 27 illustrates the structure of a response protocol message for the case of Success.

[3.1.11] Command for Getting A/I Select Parameters (Get Type C A/I Select Parameters)

A get type C A/I select parameters command is used to get A/I select parameters related to the ISO 18000-6C standards. The get type C A/I select parameters command includes a message type and a code, but does not include a payload type and an argument. The message type may be represented by 0x00 indicating a command. The code may be represented by 0x0B indicating Get Type C A/I Select Parameters.

FIG. 28 illustrates the structure of a protocol message for the get type C A/I select parameters command.

A response to the get type C A/I select parameters command includes a message type, a code, a payload type, and an argument. The message type may be represented by 0x01 indicating a response. The code may be represented by 0x0B in case of Success, and by 0xFF in case of Failure. The payload type may be represented by Payload Type D, and by Payload Type A in case of Failure.

In case of Failure, the argument may be represented by a result code 0x1B. In case of Success, the argument may be represented by a 3-bit target value to which a parameter is applied [Inventoried S0(000), Inventoried S1(001), Inventoried S2(010), Inventoried S3(011), SL(100)], a 3-bit action value defined in Type C, a 2-bit value indicating a memory bank of a tag [RFU(00), UII(01), TID(10), User(11)], a 32-bit start (or bit) address pointer of a tag memory to be compared, an 8-bit length value of the tag memory to be compared, a 1-bit truncated flag representing Enable(1) and Disable(0), a 7-bit RFU (Reserved for Further) (use a reserved value of 0000000), and a bit mask (0~255 bit) defined in Type C.

FIG. 29 illustrates the structure of a response protocol message to the Get Type C A/I Select Parameters command in case that Target=S0, Action=assert SL or inventoried->A, MB=User, Pointer=0x000000FF, Length=0x20, T=0, and Mask=11111111111111110000000000000000.

[3.1.12] Command for Setting A/I Select Parameters (Set Type C A/I Select Parameters)

A set type C A/I select parameters command is used to set A/I select parameters related to the ISO 18000-6C standards. The set type C A/I select parameters command includes a message type, a code, a payload type, and an argument.

The message type may be represented by 0x00 indicating a command. The code may be represented by 0x0C indicating Set Type C A/I Select Parameters. The payload type may be represented by Payload Type D.

The argument may be represented by a 3-bit target value to which a parameter is applied [Inventoried S0(000), Inventoried S1(001), Inventoried S2(010), Inventoried S3(011), SL(100)], a 3-bit action value defined in Type C, a 2-bit value indicating a memory bank of a tag [RFU(00), UII(01), TID (10), User(11)], a 32-bit start (or bit) address pointer of a tag memory to be compared, an 8-bit length value of the tag memory to be compared, a 1-bit truncated flag representing Enable(1) and Disable(0), a 7-bit RFU (use a reserved value of 0000000), and a bit mask (0~255 bit) defined in Type C.

FIG. 30 illustrates the structure of a protocol message for the set type C A/I select parameters command in case that Target=S0, Action=assert SL or inventoried->A, MB=User, Pointer=0x000000FF, Length=0x20, T=0, and Mask=11111111111111110000000000000000.

A response to the set type C A/I select parameters command includes a message type, a code, a payload type, and an argument. The message type may be represented by 0x01 indicating a response. The code may be represented by 0x0C in case of Success, and by 0xFF in case of Failure. The payload type may be represented by Payload Type A.

The argument may be represented by a result code 0x00 in case of Success, and by a result code 0x1B in case of Cannot Control Type C A/I Parameters.

FIG. 31 illustrates the structure of a response protocol message to the Set Type C A/I Select Parameters command.

[3.1.13] Command for Getting A/I Query-Related Parameters (Get Type C A/I Query-Related Parameters)

A get type C A/I query-related parameters command is used to get A/I query-related parameters related to the ISO 18000-6C standards.

The get type C A/I query-related parameters command includes a message type and a code, but does not include a payload type and an argument. The message type may be represented by 0x00 indicating a command. The code may be represented by 0x0D indicating Get Type C A/I Query-related Parameters. FIG. 32 illustrates the structure of a protocol message for the get type C A/I query-related parameters command.

A response to the get type C A/I query-related parameters command includes a message type, a code, a payload type, and an argument. The message type may be represented by 0x01 indicating a response. The code may be represented by 0x0D in case of Success, and by 0xFF in case of Failure. The payload type may be represented by Payload Type E in case of Success, and by Payload Type A in case of Failure. In case of Cannot Control Type C A/I Parameters, the argument may be represented by a result code 0x1B.

In case of Success, the argument may be represented by a 1-bit value indicating DR (TRcal divide ratio) (if DR is 8 or 64/3, the 1-bit value is set to '0' or '1', respectively), a 2-bit value M indicating the number of cycles per symbol (if the number of cycles is 1, 2, 4, or 8, M is set to '00', '01', '10', or '11', respectively), a 1-bit Trex value (if Pilot Tone exists, the value is set to '1'; if not, the value is set to '0'), a 2-bit Sel value (A11:'00' or '01'; ~SL:'10'; and SL:'1'), a 2-bit session value (S0:'00'; S1:'01'; S2:'10'; and S3:'11'), a 1-bit target value (A:'0'; and B:'1'), a 4-bit value Q indicating the number of slots per round, and a 3-bit UpDn value (if Q is unchanged, it is set to '000'; if Q=Q+1, Q is set to '110'; and if Q=Q−1, Q is set to '011').

FIG. 33 illustrates the structure of a response protocol message to the get type C A/I query-related parameters command for the case where DR=8, M=1, Trex=no pilot tone, Sel=A11, Session=S0, Target=A, Q=8, and UpDn=not changed.

[3.1.14] Command for Setting A/I Query-Related Parameters (Set Type C A/I Query-Related Parameters)

A set type C A/I query-related parameters command is used to set A/I query-related parameters related to the ISO 18000-6C standards.

The set type C A/I query-related parameters command includes a message type, a code, a payload type, and an argument. The message type may be represented by 0x00 indicating a command. The code may be represented by 0x0E indicating Set Type C A/I Query-related Parameters. The payload type may be represented by Payload Type E. The argument may be represented by a 1-bit value indicating DR (TRcal divide ratio) (if DR is 8 or 64/3, the 1-bit value is set to '0' or '1', respectively), a 2-bit value M indicating the number of cycles per symbol (if the number of cycles is 1, 2, 4, or 8, M is set to '00', '01', '10', or '11', respectively), a 1-bit Trex value (if Pilot Tone exists, the value is set to '1'; if not, the value is set to '0'), a 2-bit Sel value (A11:'00' or '01'; ~SL:'10'; and SL:'1'), a 2-bit session value (S0:'00'; S1:'01'; S2:'10'; and S3:'11'), a 1-bit target value (A:'0'; and B:'1'), a 4-bit value Q indicating the number of slots per round, and a 3-bit UpDn value (if Q is unchanged, it is set to '000'; if Q=Q+1, Q is set to '110'; and if Q=Q−1, Q is set to '011').

FIG. 34 illustrates the structure of a protocol message for the set type C A/I query-related parameters command for the case where DR=8, M=1, Trex=no pilot tone, Sel=A11, Session=S0, Target=A, Q=8, and UpDn=not changed.

A response to the set type C A/I query-related parameters command includes a message type, a code, a payload type, and an argument. The message type may be represented by 0x01 indicating a response. The code may be represented by 0x0E in case of Success, and by 0xFF in case of Failure. The payload type may be represented by Payload Type A. The argument may be represented by a result code 0x00 in case of Success, and by a result code 0x1B in case of Cannot Control Type C A/I Parameters.

FIG. 35 illustrates the structure of a response protocol message to the set type C A/I query-related parameters command.

[3.1.15] Command for Getting Automatic Tag Read Parameters (Get Automatic Read Parameters)

A get automatic read parameters command is used to get automatic tag read parameters.

The get automatic read parameters command includes a message type and a code, but does not include a payload type and an argument. The message type may be represented by 0x00 indicating a command. The code may be represented by 0x1F indicating Get Automatic Read Parameters. FIG. 36 illustrates the structure of a protocol message for the get automatic read parameters (Read Entire Type A Tag) command.

A response to the get automatic read parameters command includes a message type, a code, a payload type, and an argument. The message type may be represented by 0x01 indicating a response. The code may be represented by 0x0F in case of Success, and by 0xFF in case of Failure. The payload type may be represented by Payload Type F in case of Success, and by Payload Type A in case of Failure. In case of Success, the argument may include a 16-bit read cycle value indicating the number of times of read operation performed by the reader, and an 8-bit read delay time value representing a delay (msec) between read operations performed by the reader. In case of Cannot Get Automatic Parameters, the argument may include a result code 0x0F. In case of Not Supported Command, the payload may include a result code 0x17. FIG. 37 illustrates the structure of a response protocol message to the set automatic read parameters command for the case where Read Cycle=50, and Read Delay Time=50 msec.

[3.1.16] Command for Setting Automatic Tag Read Parameters (Set Automatic Read Parameters)

A set automatic read parameters command is used to set automatic read parameters.

The set automatic read parameters command includes a message type, a code, a payload type, and an argument. The message type may be represented by 0x00 indicating a command. The code may be represented by 0x10 indicating Set Automatic Read Parameters. The payload type may be represented by Payload Type F. The argument may include a 16-bit read cycle value indicating the number of times of read operation performed by the reader, and an 8-bit read delay time value representing a delay (msec) between read operations performed by the reader. FIG. 38 illustrates the structure of a protocol message for the set automatic read parameters command for the case where Read Cycle=50, and Read Delay Time=50 msec.

A response to the set automatic read parameters command includes a message type, a code, a payload type, and an argument. The message type may be represented by 0x01 indicating a response. The code may be represented by 0x10 in case of Success, and by 0xFF in case of Failure. The payload type may be represented by Payload Type A. The argument may be represented by a result code 0x00 in case of Success, and by a result code 0x10 in case of Automatic Parameter Control Failure. When Read Cycle and Read Delay Time have invalid parameters, the argument may be represented by a result code 0x0E. In case of Not Supported Command, the argument may be represented by 0x17. FIG. 39 illustrates the structure of a response protocol message for the case of Success.

[3.2] Tag Read Category

[3.2.1] Command for Reading a Tag UID (Read Type B UID)

A read type B UID command is used to read a UID of an ISO 18000-B tag. The UID has a length of 64 bits and is essential when a write operation is performed on a corresponding tag. A 40-bit SUID may be used instead of the 64-bit UID. However, the present invention is described with respect to the use of the 64-bit UID. The read type B UID command is used to read 8th through 16th address values from a tag, which correspond to the length of UII Set and the length of AD Set, respectively. The address values are, respectively;

08~09: Tag manufacturer
10~11: Hardware Type
12: Embedded Application code
13: Application Family ID
14: Storage Data Format(Referring to ISO/IEC 15961 8.2, 15962 B.63, and 15962 E.4)
15: Length of UII Set (bytes)
16: Length of AD Set (bytes)

The read type B UID command includes a message type and a code, but does not include a payload type and an argument. The message type may be represented by 0x00 indicating a command. The code may be represented by 0x21 indicating Read Type B UID. FIG. 40 illustrates the structure of a protocol message for the read Type B UID command.

A response to the read type B UID command includes a message type, a code, a payload type, and an argument. The message type may be represented by 0x01 indicating a response. The code may be represented by 0x21 in case of Success, and by 0xFF in case of Failure. The payload type may be represented by Payload Type M in case of Success, and Payload Type A in case of Failure or when there is no tag to be read (No Tag Detected).

The argument represent Success, No Tag Detected, and Failure. In case of Success, the argument may be represented by the UID, Manufacturer, Hardware Type, Embedded Application Code (EAC), Application Family ID (AFID), Storage Data Format (SDF), UII Set Length, and the AD Set Length. In case of No Tag Detected, the argument may be represented by a result code 0x15. In case of Read Failure, the argument may be represented by a result code 0x09. In case of Not Supported Command, the argument may be represented by a result code 0x17. FIG. 41 illustrates the structure of a response protocol message for the read type B UID command for the case where UID=0xE035000000000001, Manufacturer=0x1234, Hardware Type=0x5678, EAC=0x0A, AFID=0x01, SDF=0x00, UII Set Length=8, and AD Set Length=16.

[3.2.2] Command for Reading a UID Block of a Tag (Read Type C UII Block)

A read type C UII block command is used to read and inform a UII block of an ISO 18000-C tag. The UII block exists in a UII memory bank of a tag and denotes all of UII or UII Set and a PC section of the type C tag. The UII or the UII Set has a variable length, while the PC section has a fixed length. Therefore, when interpreting a response, the length of the UII or the UII Set can be found by subtracting 2 from Payload Length.

The read type C UII block command includes a message type and a code, but does not include a payload type and an argument. The message type may be represented by 0x00 indicating a command. The code may be represented by 0x22 indicating Read Type C UII Block. FIG. 42 illustrates the structure of a protocol message for the read Type C UII Block command.

A response to the read type C UII Block command includes a message type, a code, a payload type, and an argument. The message type may be represented by 0x01 indicating a response. The code may be represented by 0x22 in case of Success, and by 0xFF in case of Failure. The payload type may be represented by Payload Type H in case of Success, and Payload Type A in case of Failure or in case of No Tag Detected.

In case of Success, the argument may be represented by the UII Block (UII+PC). In case of No Tag Detected, the argument may be represented by a result code 0x15. In case of Read Failure, the argument may be represented by a result code 0x09. FIG. 43 illustrates the structure of a Read Type C UII Block Response protocol message for the case of a 96-bit UII, that is, the case where PC=0x2000, and UII=0x30F4257BF4625F8000000002.

[3.2.3] Command for Reading a User Memory Bank Area of a Tag (Read Type B User Data)

A read type B user data command is used to read a user memory bank area of an ISO 18000-B tag. The user memory bank area is read by its length from a start address. In Type B, since UII or UII Set is stored in the first address of the user memory bank area, the start address must be set to '0' to read the UII or the UII Set.

The read type B user data command includes a message type, a code, a payload type, and an argument. The message type may be represented by 0x00 indicating a command. The code may be represented by 0x23 indicating Read Type B User Data. The payload type may be represented by Payload Type I. The argument may include a 64-bit UID of a tag to read a user memory bank, a 16-bit start address of a user memory bank area, and 16-bit length (User Data Length, on a byte basis) by which the user memory bank area is to be read. FIG. 44 illustrates the structure of a protocol message for the read type B user data command for the case where UID=0xE035000000000001, Start Address=0x0000, and Length=8 byte. A response to the read type B user data command includes a message type, a code, a payload type, and an argument. The message type may be represented by 0x01 indicating a response. The code may be represented by 0x23 in case of Success, and by 0xFF in case of Failure. The payload type may be represented by Payload Type B in case of Success, and by Payload Type A in case of Failure or in case of No Tag Detected. In case of Success, the argument may include the contents of the user memory bank (e.g., UII Set). In case of No Tag Detected, the argument may include a result code 0x15. In case of Read Failure, the argument may include a result code 0x09. In case of No User Data, the argument may include a result code 0x1C. In case of Not Supported Command, the argument may include a result code 0x17. FIG. 45 illustrates the structure of a response protocol message to the Read Type B user data command for the case where UII Set=0x123456789ABCDEF0.

[3.2.4] Command for Reading a User Memory Bank Area of a Tag (Read Type C User Data)

A read type C user data command is used to read a user memory bank area of an ISO 18000-C tag. The user memory bank area is read by its length from a start address. When a protocol message for the read type C user data command is written, UII or UII Set indicating a tag to read the user memory bank is needed. The UII or the UII Set has a variable length, while other arguments have a fixed length. Therefore, Payload Length can be found by adding 4 to the length of the UII or the UII Set.

The read type C user data command includes a message type, a code, a payload type, and an argument. The message type may be represented by 0x00 indicating a command. The code may be represented by 0x24 indicating Read Type C User Data. The payload type may be represented by Payload Type J. The argument may include a 64-bit UID or UII Set (variable length) of a tag to read a user memory bank, a 16-bit start address of a user memory bank area, and 16-bit length (User Data Length, on a byte basis) by which the user memory bank area is to be read. FIG. 46 illustrates the structure of a protocol message for the read type C user data command for the case where UID=0x30F4257BF8000000002, Start Address=0x0000, and Length=15 byte.

A response to the read type C user data command includes a message type, a code, a payload type, and an argument. The message type may be represented by 0x01 indicating a response. The code may be represented by 0x24 in case of Success, and by 0xFF in case of Failure. The payload type may be represented by Payload Type G in case of Success, and by Payload Type A in case of Failure, No Tag Detected, or No User Data.

In case of Success, the argument may include the contents of the user memory bank. In case of No Tag Detected, the argument may include a result code 0x15. In case of Read Failure, the argument may include a result code 0x09. In case of No User Data, the argument may include a result code 0x1C. FIG. 47 illustrates the structure of a response protocol message to the Read Type C user data command for the case where the contents of the user memory bank='FLATRON L1740BQ'.

[3.2.5] Command for Reading the Entire Contents of a Tag (Read Entire Type B Tag)

A Read Entire Type B Tag command is used to read the entire contents of an ISO 18000-B tag, and the entire contents of the tag is received as a response. However, a user memory bank is read by a predetermined length. Since only data read from a user memory bank area of all fields of the response have a variable length, this length can be found by subtracting 24 from Payload Length. Wherein, a memory layout is represented by 12th through 17th address of Type B Tag. The value of 12th through 17th address is referred to the value of address of the Read Type B UID command.

The Read Entire Type B Tag command includes a message type, a code, a payload type, and an argument. The message type may be represented by 0x00 indicating a command. The code may be represented by 0x25 indicating Read Entire Type B Tag. The payload type may be represented by Payload Type K. The argument may include a 16-bit User Data Length indicating the size of data read from the user memory bank. FIG. 48 illustrates the structure of a protocol message for the Read Entire Type B Tag command for the case where User Data Length=15.

A response message for the Read Entire Type B Tag command includes a message type, a code, a payload type, and an argument. The message type may be represented by 0x01 indicating a response. The code may be represented by 0x25 in case of Success, and by 0xFF in case of Failure. The payload type may be represented by Payload Type L in case of Success, and by Payload Type A in case of Failure or No Tag Detected.

In case of Success, the argument may include UID, Manufacturer, Hardware Type, Memory Layout, and User Data. In case of No Tag Detected, the argument may include a result code 0x15. In case of Read Failure, the argument may include a result code 0x09. In case of Not Supported Command, the argument may include a result code 0x17. FIG. 49 illustrates the structure of a response protocol message to the Read Entire Type B Tag command for the case where UID=0xE035000000000001, Manufacturer=0x1234, H/W Type=0x5678, Memory Layout=0x000000000000, and Data to be written='FLATRON L1740BQ.

[3.2.6] Command for Reading the Entire Contents of a Tag (Read Entire Type C Tag)

A Read Entire Type C Tag command is used to read the entire contents of an ISO 18000-C tag. The ISO 18000-C tag has four memory banks including Reserved, TID, UII, and User Data. This command is used to read three memory banks including TID, UII, and User Data, except Reserved.

The Read Entire Type C Tag command includes a message type, a code, a payload type, and an argument. The message type may be represented by 0x00 indicating a command. The code may be represented by 0x26 indicating Read Entire Type C Tag. The payload type may be represented by Payload Type K. The argument may include a 16-bit User Data Length indicating the size of data read from the user memory bank. FIG. 50 illustrates the structure of a protocol message for the Read Entire Type C Tag command for the case where User Data Length=14.

A response message for the Read Entire Type C Tag command includes a message type, a code, a payload type, and an argument. The message type may be represented by 0x01 indicating a response. The code may be represented by 0x26 in case of Success, and by 0xFF in case of Failure. The payload type may be represented by Payload Type N in case of Success, and by Payload Type A in case of Failure or No Tag Detected.

In case of Success, the argument may include a TID memory bank, UII or UII Set, PC, and data read from the user memory bank. In case of No Tag Detected, the argument may include a result code 0x15. In case of Read Failure, the argument may include a result code 0x09. FIG. 51 illustrates the structure of a response protocol message to the Read Entire Type C Tag command for the case where TID=0xA98654E2, PC=0x2000, 96-bit UII=0x30F4257BF4625F8000000002, and Data of User Memory Bank='FLATRON L1740B.

[3.2.7] Command for Starting an Automatic Tag Read Operation (Start Automatic Read)

A Start Automatic Read command is used to start an automatic tag read operation. A protocol message constituting this command may include a message type, a code, a payload type, and an argument. The message type may be represented by 0x00 indicating a command. The code may be represented by 0x27 indicating Start Automatic Read. The payload type may be represented by Payload Type 0.

The argument may be represented by an 8-bit Command Code (0x21-0x26; an automatic read operation is not performed for other values) and a 16-bit Repeat Cycle. The 8-bit Command Code indicates a code of a command to perform an automatic read operation. When a read operation of a designated unit in a Read Cycle is regarded as one Repeat Cycle, the 16-bit Repeat Cycle indicates the number of times of repetition of the Repeat Cycle (i.e., the reading number of times=ReadCycle×RepeatCycle). FIG. 52 illustrates the structure of a protocol message for the Start Automatic Read command for the case where Read Entire Type C Tag, Access Password=0x12345678, and Read Cycle=100.

A response protocol message for the Start Automatic Read command includes a message type, a code, a payload type, and an argument. The message type may be represented by 0x01 indicating a response. The code may be represented by 0x27 in case of Success, and by 0xFF in case of Failure. The payload type may be represented by Payload Type A.

In case of Success, the argument may include a result code 0x00. In case of Automatic Read Failure, the argument may include a result code 0x0A, a result code 0x0E for the case where a code of the command is not in the range of 0x21~0x26, a result code 0x0E for the case where Repeat Cycle is not '0', and a result code 0x0B for the case where an automatic read operation is being performed (Automatic Read in Operation). FIG. 53 illustrates the structure of a response protocol message for the case of Success.

A notification message may be used for Start Automatic Read. This notification message may include a message type, a code, a payload type, and an argument. The message type may be represented by 0x02 indicating Notification. The code may be identical to the command code that is used as the argument in the Start Automatic Read command. In case where data read from a tag is transmitted, the payload type may be identical to the response corresponding to a command code 0x21~0x26. In case where the automatic read operation is performed by the predetermined number of times and thus completed (Automatic Read Completed), the payload type may be represented by Payload Type A.

Meanwhile, in case where data read from a tag is transmitted, the argument may be identical to a response corresponding to a command code 0x21~0x26. In case where the automatic read operation is performed by the predetermined number of times and thus completed (Automatic Read Completed), the argument may include a result code 0x1F. When there are no more tags to read (No more Tags to Read), the argument may include a result code 0x20. FIG. 54 illustrates the structure of a notification protocol message for the case of Automatic Read Completed. In case where data read from a tag is transmitted, the notification protocol message may be identical to the response corresponding to the command code 0x21~0x26.

[3.2.8] Command for Stopping an Automatic Tag Read Operation (Stop Automatic Read)

A Stop Automatic Read command is used to stop an automatic tag read operation. The Stop Automatic Read command includes a message type and a code, but does not include a payload type, and an argument. The message type may be represented by 0x00 indicating a command. The code may be represented by 0x28 indicating Stop Automatic Read. FIG. 55 illustrates the structure of a protocol message for the Stop Automatic Read command for the case of Read Entire Type A Tag command. A response protocol message for the Stop Automatic Read command includes a message type, a code, a payload type, and an argument. The message type may be represented by 0x01 indicating a response. The code may be represented by 0x28 in case of Success, and by 0xFF in case of Failure. The payload type may be represented by Payload Type A. In case of Success, the argument may include a result code 0x00. In case of Cannot Stop Automatic Read, the argument may include a result code 0x0C. In case where an automatic read operation is not being performed, the argument may include a result code 0x0D. FIG. 56 illustrates the structure of a protocol message for the Stop Automatic Read Response for the case of Success.

[3.3] Tag Write Category

[3.3.1] Command for Writing a UII Block in a UII Memory Bank of a Tag (Write Type C UII Block)

A Write Type C UII Block command is used to write a UII block in a UII memory bank of an ISO 1800-C tag, wherein CRC is calculated and process by the mobile RFID reader. The Write Type C UII Block command includes a message type, a code, a payload type, and an argument. The message type may be represented by 0x00 indicating a command. The code may be represented by 0x41 indicating Write Type C UII Block. The payload type may be represented by Payload Type P. The argument may include a 32-bit Access Password for writing a Type C tag, a 16-bit UII Length for representing the length of UII or UII Set, a UII or UII Set (variable) for indicating a tag to be written in, a 16-bit New UII Length for representing the length of new UII or UII Set, a New UII or UII Set (variable) for representing a New UII or UII Set to be written in the tag, and a PC for representing a PC value to be written in the tag. FIG. 57 illustrates the structure of a protocol message for the Write Type C UII Block command for the case where Access Password=0x87651234, UII=0x30F4257BF46258000000001, New UII=0x30F4257BF46258000000002, and PC=0x2000.

A response message for the Write Type C UII Block command includes a message type, a code, a payload type, and an argument. The message type may be represented by 0x01 indicating a response. The code may be represented by 0x41 in case of Success, and by 0xFF in case of Failure. The payload type may be represented by Payload Type A. The argument may include a result code 0x00 for the case of Success, a result code 0x10 for the case of Write Failure, and a result code 0x17 for the case of Not Supported Command. FIG. 58 illustrates the structure of a response protocol message for the Write Type C UII Block command.

[3.3.2] Command for Writing the Entire Contents of a Tag (Write Type B User Data)

A Write Type B User Data command is used to write the entire contents of an ISO 1800-B tag. The Write Type B User Data command includes a message type, a code, a payload type, and an argument. The message type may be represented by 0x00 indicating a command. The code may be represented by 0x42 indicating Write Type B User Data. The payload type may be represented by Payload Type Q. The argument may include a 64-bit UID of a tag to be written in, a 16-bit Start Address representing a start address of a user memory bank area in which data are to be written, a 16-bit Length representing the size (on a byte basis) of data to be written, and a User Data (variable) to be written in the user memory bank by a length designated by the 16-bit Length. FIG. 59 illustrates the structure of a protocol message for the Write Type B User Data command for the case where UID=0xE35000000000001, Start Address=0x00, Length=15, and User Memory Bank='FLATRON L1740BQ.

A response message for the Write Type B User Data command includes a message type, a code, a payload type, and an argument. The message type may be represented by 0x01 indicating a response. The code may be represented by 0x42 in case of Success, and by 0xFF in case of Failure. The payload type may be represented by Payload Type A. The argument may include a result code 0x00 for the case of Success, a result code 0x15 for the case of No Tag Detected, a result code 0x10 for the case of Write Failure, and a result code 0x17 for the case of Not Supported Command. FIG. 60 illustrates the structure of a response protocol message for the Write Type B User Data command.

[3.3.3] Command for Writing the Entire Contents of a Tag (Write Type C User Data)

A Write Type C User Data command is used to write the entire contents of an ISO 1800-C tag. The Write Type C User Data command includes a message type, a code, a payload type, and an argument. The message type may be represented by 0x00 indicating a command. The code may be represented by 0x43 indicating Write Type C User Data. The payload type may be represented by Payload Type R. The argument may include a 32-bit Access Password necessary for writing data in a user memory bank area, a 16-bit UII Length (variable) representing the length of UII or UII Set, a 16-bit Start Address representing a start address of the user memory bank area in which data are to be written, a 16-bit User Data Length representing the size (on a byte basis) of data to be written, and a User Data (variable) to be written corresponding to a length designated by the 16-bit User Data Length. FIG. 61 illustrates the structure of a protocol message for the Write Type C User Data command for the case where Access Password=0x87651234, UII=0x30F4257BF46258000000001, Start Address=0x00, and Data to be written='FLATRON L1740BQ'.

A response message for the Write Type C User Data command includes a message type, a code, a payload type, and an argument. The message type may be represented by 0x01 indicating a response. The code may be represented by 0x43 in case of Success, and by 0xFF in case of Failure. The payload type may be represented by Payload Type A. The argument may include a result code 0x00 for the case of Success, a result code 0x15 for the case of No Tag Detected, a result code 0x10 for the case of Write Failure, and a result code 0x17 for the case of Not Supported Command. FIG. 62 illustrates the structure of a response protocol message for the Write Type C User Data command.

[3.3.4] Command for Writing the Entire Contents in a Tag (Write Entire Type B Tag)

A Write Entire Type B Tag command is used to write the entire contents in an ISO 1800-B tag. Data can be written in UID, Memory Layout and a user memory bank area. However, regions of Manufacture and H/W Type are designated at a manufacturing stage and thus cannot be written.

The Write Entire Type B Tag command includes a message type, a code, a payload type, and an argument. The message type may be represented by 0x00 indicating a command. The code may be represented by 0x44 indicating Write Entire Type B Tag. The payload type may be represented by Payload Type S. The argument may include a 64-bit UID of a Type B tag to be written, a 48-bit Memory Layout that can be designated and written by User Application (if necessary), a 16-bit User Data Length indicating the size of data to be written in the user memory bank, and a User Data indicating data to be written in the user memory bank of a tag (if necessary). FIG. 63 illustrates the structure of a protocol message for the Write Entire Type B Tag command for the case where UID=0xE35000000000001, Memory Layout=0x000000000000, and Data to be written='FLATRON L1740BQ'.

A response protocol message for the Write Entire Type B Tag command includes a message type, a code, a payload type, and an argument. The message type may be represented by 0x01 indicating a response. The code may be represented by 0x44 in case of Success, and by 0xFF in case of Failure. The payload type may be represented by Payload Type A. The argument may include a result code 0x00 for the case of Success, a result code 0x15 for the case of No Tag Detected, a result code 0x10 for the case of Write Failure, and a result code 0x17 for the case of Not Supported Command. FIG. 64 illustrates the structure of a response protocol message for the Write Entire Type B Tag command.

[3.3.5] Command for Writing the Entire Contents in a Tag (Write Entire Type C Tag)

A Write Entire Type C Tag command is used to write the entire contents in an ISO 1800-C tag. The Write Entire Type C Tag command is useful for simultaneously writing a UII Block and a user memory bank. Also, the Write Entire Type C Tag command can be used to write a Reserved Bank area in which Kill Password and Access Password are sequentially included. If a password needs to be changed, it must be written in a Reserved Bank area.

The Write Entire Type C Tag command includes a message type, a code, a payload type, and an argument. The message type may be represented by 0x00 indicating a command. The code may be represented by 0x45 indicating Write Entire Type C Tag. The payload type may be represented by Payload Type T.

The argument may include a 32-bit Access Password for writing a Type C tag, a 16-bit UII Length for representing the length of UII or UII Set, a UII or UII Set (variable) for indicating a tag to be written in, a 16-bit New UII Length for representing the length of new UII or UII Set, a New UII or UII Set (variable) for representing a New UII or UII Set to be written in the tag, a 64-bit PC to be written in the tag, a User Data used when there are data to be written in a user memory bank of the tag, a 16-bit Reserved Bank Length representing the length of data to be written in a reserved bank, a Reserved Bank Data (variable) to be written in the reserved bank.

FIG. 65 illustrates the structure of a protocol message for the Write Entire Type C Tag command for the case where Access Password=0x87651234, UII=0x30F4357BF46258000000001, New UII=0x30F4357BF46258000000002, PC=0x2000, Data to be written='FLATRON L1740BQ', Kill Password=0x12345678, and Access Password=0x87654321.

A response protocol message for the Write Entire Type C Tag command includes a message type, a code, a payload type, and an argument. The message type may be represented by 0x01 indicating a response. The code may be represented by 0x45 in case of Success, and by 0xFF in case of Failure. The payload type may be represented by Payload Type A.

The argument may include a result code 0x00 for the case of Success, a result code 0x15 for the case of No Tag Detected, a result code 0x10 for the case of Write Failure, and a result code 0x17 for the case of Not Supported Command. FIG. 66 illustrates the structure of a response protocol message for the Write Entire Type C Tag command for the case of Success.

[3.4] Tag Kill Category

[3.4.1] Command for Killing a Tag (Kill Type C Tag)

A Kill Type C Tag command is used to kill an ISO 1800-C tag. Access Password and Kill Password are all required for the killing operation, which aims at security. The Kill Type C Tag command includes a message type, a code, a payload type, and an argument. The message type may be represented by 0x00 indicating a command. The code may be represented by 0x61 indicating Kill Type C Tag. The payload type may be represented by Payload Type U.

The argument may include a 32-bit Access Password required for accessing a tag, a 32-bit Kill Password required for killing a tag, a 16-bit UII Length indicating the length of UII or UII Set, and a UII or UII Set (variable) indicating a Type C tag to be killed. FIG. 67 illustrates the structure of a protocol message for the Kill Type C Tag command for the case where Access Password=0x12345678, Kill Password=0x87654321, and UII=0x30F4357BF46258000000001.

A response message for the Kill Type C Tag command includes a message type, a code, a payload type, and an argument. The message type may be represented by 0x01 indicating a response. The code may be represented by 0x61 in case of Success, and by 0xFF in case of Failure. The payload type may be represented by Payload Type A.

The argument protocol may include a result code 0x00 for the case of Success, a result code 0x15 for the case where there is no tag to be killed (No Tag Detected), and a result code 0x12 for the case of Kill Failure. FIG. 68 illustrates the structure of a response protocol message for the Kill Type C Tag command for the case of Success.

[3.5] Tag Lock Control Related Category

[3.5.1] Command for Controlling Lock of a Type B Tag (Lock Type B Tag)

A Lock Type B Tag command is used to control lock of a Type B tag. The Lock Type B Tag command includes a message type, a code, a payload type, and an argument. The message type may be represented by 0x00 indicating a command. The code may be represented by 0x81 indicating Lock Type B Tag. The payload type may be represented by Payload Type V.

The argument may include a 64-bit UID required for selecting a tag to be locked, and an 8-bit Address (0x00~0xFF) representing an address of a tag to be killed. FIG. 69 illustrates the structure of a protocol message for the Lock Type B Tag command for the case where UID=0xE035000000000001 and the $30^{th}$ block is locked.

A response protocol message for the Lock Type B Tag command includes a message type, a code, a payload type, and an argument. The message type may be represented by 0x01 indicating a response. The code may be represented by 0x81 in case of Success, and by 0xFF in case of Failure. The payload type may be represented by Payload Type A.

The argument may include a result code 0x00 for the case of Success, a result code 0x15 for the case where there is no tag to be locked (No Tag Detected), a result code 0x13 for the case of Lock Control Failure, and a result code 0x17 for the case of Not Supported Command. FIG. 70 illustrates the structure of a response protocol message for the Lock Type B Tag command for the case of Success.

[3.5.2] Command for Controlling Lock of a Type C Tag (Lock Type C Tag)

A Lock Type C Tag command is used to control lock of a Type C tag. The Lock Type C Tag command includes a message type, a code, a payload type, and an argument. The message type may be represented by 0x00 indicating a command. The code may be represented by 0x82 indicating Lock Type C Tag. The payload type may be represented by Payload Type W. The argument may include a 32-bit Access Password required for a locking operation, a 16-bit UII Length indicating the length of UII or UII Set, a UII or UII Set (variable) indicating a Type C tag to be locked, and a 24-bit Lock Data for controlling a locking operation (use a 20-bit flag for controlling a locking operation and the less significant 20 bits; the less significant 4 bits='0'). FIG. 71 illustrates the structure of a protocol message for the Lock Type C Tag command for the case where UII=0x30F4257BF46258000000001, Access Password=0x87654321, and a UII code is permanently locked.

A response protocol message for the Lock Type C Tag command includes a message type, a code, a payload type, and an argument. The message type may be represented by 0x01 indicating a response. The code may be represented by 0x82 in case of Success, and by 0xFF in case of Failure. The payload type may be represented by Payload Type A.

The argument may include a result code 0x00 for the case of Success, a result code 0x15 for the case where there is no tag to be locked (No Tag Detected), a result code 0x13 for the case of Lock Control Failure, and a result code 0x17 for the case of Not Supported Command. FIG. 72 illustrates the structure of a response protocol message for the Lock Type C Tag command for the case of Success.

[3.6] Additional Function Category

[3.6.1] Command for Getting the Last Result Code (Get Last Result)

A Get Last Result command is used to get the last result code. The Get Last Result command includes a message type and a code, but does not include a payload type and an argument. The message type may be represented by 0x00 indicating a command. The code may be represented by 0xA1 indicating Get Last Result. FIG. 73 illustrates the structure of a protocol message for the Get Last Result command.

A response protocol message for the Get Last Result command includes a message type, a code, a payload type, and an argument. The message type may be represented by 0x01 indicating a response. The code may be represented by 0xA1 in case of Success, and by 0xFF in case of Failure. The payload type may be represented by Payload Type A. The argument may include the last result code for the case of Success, a result code 0x14 for the case of Cannot Get Last Result, and a result code 0x17 for the case of Not Supported Command. FIG. 74 illustrates the structure of a response protocol message for the case where the last result is Read Failure.

[3.6.2] Command for Starting a Test Mode (Start Test Mode)

A Start Test Mode command is used to change the RFID reader into a test mode. The Start Test Mode command includes a message type and a code, but does not include a payload type and an argument. The message type may be represented by 0x00 indicating a command. The code may be represented by 0xA2 indicating Start Test Mode. FIG. 75 illustrates the structure of a protocol message for the Start Test Mode command.

A response protocol message for the Start Test Mode command includes a message type, a code, a payload type, and an argument. The message type may be represented by 0x01 indicating a response. The code may be represented by 0xA2 in case of Success, and by 0xFF in case of Failure. The payload type may be represented by Payload Type A. The argument may include a result code 0x00 for the case of Success, and a result code 0x1E for the case of Test Mode Control Failure. FIG. 76 illustrates the structure of a response protocol message for the case of Success.

[3.6.3] Command for Stopping a Test Mode (Stop Test Mode)

A Stop Test Mode command is used to stop a test mode of the reader. The Stop Test Mode command includes a message type and a code, but does not include a payload type and an argument. The message type may be represented by 0x00 indicating a command. The code may be represented by 0xA3 indicating Stop Test Mode. FIG. 77 illustrates the structure of a protocol message for the Stop Test Mode command.

A response protocol message for the Stop Test Mode command includes a message type, a code, a payload type, and an argument. The message type may be represented by 0x01 indicating a response. The code may be represented by 0xA3 in case of Success, and by 0xFF in case of Failure. The payload type may be represented by Payload Type A.

The argument may include a result code 0x00 for the case of Success, and a result code 0x1E for the case of Test Mode Control Failure. FIG. 78 illustrates the structure of a response protocol message for the Stop Test Mode command for the case of Success.

[3.6.4] Command for Starting a Receive Test Mode (Start Receive Test)

A Start Receive Test command can be used only in a test mode, and is used to test the receive sensitivity of the reader. Upon receiving the Start Receive Test command, the reader enters a receive standby mode to accumulatively add the number of successfully-received bits.

The Start Receive Test command includes a message type and a code, but does not include a payload type and an argument. The message type may be represented by 0x00 indicating a command. The code may be represented by 0xA4 indicating Start Test Mode. FIG. 79 illustrates the structure of a protocol message for the Start Receive Test command.

A response protocol message for the Start Receive Test command includes a message type, a code, a payload type, and an argument. The message type may be represented by 0x01 indicating a response. The code may be represented by 0xA4 in case of Success, and by 0xFF in case of Failure. The payload type may be represented by Payload Type A.

The argument may include a result code 0x00 for the case of Success, and a result code 0x1D for the case where the reader is not in a test mode. FIG. 80 illustrates the structure of a response protocol message for the Start Receive Test command for the case of Success.

[3.6.5] Command for Stopping a Receive Test (Stop Receive Test)

A Stop Receive Test command can be used only in a test mode, and is used to test the receive sensitivity of the reader. When receiving the Stop Receive Test command, the reader exits the standby mode to receive an A/I packet and then transmits the number of successfully-received bits to the processor.

The Stop Receive Test command includes a message type and a code, but does not include a payload type and an argument. The message type may be represented by 0x00 indicating a command. The code may be represented by 0xA5 indicating Stop Test Mode. FIG. 81 illustrates the structure of a protocol message for the Stop Receive Test command.

A response protocol message for the Stop Receive Test command includes a message type, a code, a payload type, and an argument. The message type may be represented by 0x01 indicating a response. The code may be represented by 0xA5 in case of Success, and by 0xFF in case of Failure. The payload type may be represented by Payload Type G in case of Success, and by Payload Type A in case of Failure. In case of Success, the argument may include a 32-bit value indicating the number of received bits. In case of Test Mode Control Failure, the argument may include a result code 0x1E. FIG. 82 illustrates the structure of a response protocol message for the case where the number of received bits is 100000.

[3.7] Appendices for Command, Response, and Notification

[3.7.1] Commonly Applied Result Codes

The following result codes are commonly used for all of commands, responses and notifications.

Success: The result generated when a command is successfully executed, which can be represented by, for example, 0x00.

Invalid Parameter: The result generated when an argument of a command has an invalid value, which can be represented by, for example, 0x0E.

Not Supported Command: The result generated when the reader cannot support a command. An optional command may not be implemented in the reader. The result can be used in this case. This code can be represented by, for example, 0x17.

Undefined Command: The result generated when the reader receives a command that was not defined by the present invention or the vendor, which can be represented by, for example, 0x18.

Reader is not in Test Mode: The result generated when a command usable only in a test mode is issued when the reader is not in the test mode, which can be represented by, for example, 0x1D.

[3.7.2] Valid Value Ranges of Parameters Used in Commands

Table 12 below illustrates valid value ranges of parameters used in each command. When a parameter value deviates from such range, the aforementioned Invalid Parameter (0x0E) error code must be included in a response message to be transmitted. Since Table 12 does not deal with parameters for a password necessary for a Type C tag related command, a command of a tag write category, commands of a tag lock control related category, such parameters must be based on the corresponding standard document.

TABLE 12

| Command | Use Parameter | Valid Value Range |
|---|---|---|
| Reader Power Control | 8-bit arg | 0x00 or 0xFF |
| Reader Connection Control | 8-bit arg | 0x00 or 0xFF |
| Get Reader Info | 8-bit arg | 0x00~0x04 |
| Set Signal Strength | 8-bit arg | 0x00~0x64 |
| Set Region | 8-bit arg | 0x01~0x1F |
| Set Type B A/I Parameters | Based on ISO 18000-6B Standards | |
| Set Type C A/I Select Parameters | Based on ISO 18000-6C Standards | |
| Set Type C A/I Query related Parameters | Based on ISO 18000-6C Standards | |
| Set Automatic Read Parameters | 16-bit Read Cycle | 0x0001~0xFFFF |
| | 8-bit Read Delay Time | 0x00~0xFF |
| Read Type B User Data | 16-bit User Data Length | 0x0001~0xFFFF |
| Read Type C User Data | 16-bit User Data Length | 0x0001~0xFFFF |
| Start Automatic Read | 16-bit Repeat Cycle | 0x0001~0xFFFF |

[3.7.3] Process Performed when there is No Response to a Command.

In the RFID reader control system according to the present invention, the following process is performed when there is no response to a command issued from the processor to the reader.

When a driver receives no response from the reader even after a predetermine time from the transmission time of a command, it transmits an error message to an upper layer. A response message received right after the above process is disregarded and deleted. A response waiting time Trespoly may be set to a predetermined value, for example, 500 msec. When a corresponding default value is adjusted, a changed value must be clearly expressed.

[3.7.4] Management of Reader Status

For management of a reader status, a reader power status and a reader connection status are managed by the driver.

[3.7.5] Details about Notification Related to Automatic Read

When two or more tags are read, one notification must be performed for each of the read tags. When there is no tag to be read by the reader, the reader transmits a result code of 'No more Tags to Read' by a notification using a payload type A and stops an automatic read operation. Such notification must be clearly transmitted to an upper layer.

[4] Test Certification and Test Mode

The present invention enables test certification to be performed on the A/I protocol standards implemented in a mobile RFID reader according to the mobile RFID forum test certification standards. For the test certification, the A/I section defined in the ISO 18000-6C standards is mandatory and the contents about the ISO 18000-6B standards are optional.

[4.1] Test Mode

In the test mode, a protocol defined in the A/I standards implemented in a mobile RFID reader for test certification is received as it is, and to give a response thereto is supported. That is, a command is directly given in the format of a protocol defined in the A/I standards, and a response thereto is also received in the format of a protocol defined in the A/I standards. As above, a protocol message defined in the A/I standards is used, as it is, to make it possible to perform the test certification.

In order to convert the reader into the test mode, corresponding commands within the abovementioned additional category must be used. At this time, the reader must be in a power-on state and must be connected to the processor. The corresponding commands are the Start Test Mode command and the Stop Test Mode command that have been described above. When the Start Test Mode command is executed, a response thereto is received. When a normal response is received, the reader converts into the test mode. In the test mode, only a protocol message having a message type field of 0x03 in its header can be used. That is, commands of several categories defined above cannot be used. When receiving a general command in the test mode, the reader transmits the result code of 'Reader is not in Test Mode' to the processor and disregards the general command.

The Stop Test Mode command is use to stop the test mode. When receiving the Stop Test Mode command, the reader exits the test mode and can receive and process a general command.

[4.2] Protocol Message in Test Mode

In the test mode, an A/I protocol to receive the test certification can be used as it is. The A/I protocol is encapsulated into the payload field defined in the present invention. The contents of the protocol message in the test mode are as follows:

Preamble and End Mark values are used in the same manner.

The Message Type field of a header uses information (e.g., 0x03) indicating a protocol message in the test mode.

The Code field of the header includes a value 0x00 in case of a command based on the A/I protocol, and includes a value 0x01 in case of a response. A command is a protocol message that is transmitted from a reader to a tag, while the response is a protocol message that is transmitted from a tag to a reader.

The Payload Length field of the header indicates the total length of the A/I protocol message included in the payload.

The payload field itself corresponds to the A/I protocol message.

FIG. 83 illustrates the structure of a protocol message used in the test mode.

[4.3] Procedure for Processing Protocol Message in Test Mode

The RFID reader may process a protocol message of the test mode according to the following procedure.

[4.3.1] When the Reader Receives a Message in the Test Mode (a). The reader reads a header field from a message received according to an RFID protocol.

(b). The reader checks a preamble.

(c). The reader ascertains that a Message Type field value is 0x03

(d). The reader ascertains that a Code field value is 0x00

(e). The reader reads the Read Payload Length field to check the length of an A/I protocol message in a payload section (f). The reader reads the A/I protocol message from the payload section designated by the Payload Length field (g). The reader transfers the read A/I protocol message to the A/I unit. The A/I unit transfers the received A/I protocol message to a tag.

[4.3.2] When the Reader Transmits a Message in the Test Mode (a). An A/I unit receives an A/I protocol message from a tag.

(b). The received A/I protocol message itself acts as a payload.

(c). The entire A/I protocol message is inserted into a Payload Length field.

(d). A Code field value is set to 0x01.

(e). A Message Type field value is set to 0x03.

(f). Preamble and End Mark are added and transmitted.

[4.4] Test the Receive Sensitivity of the Reader

In the test mode, two commands are provided to test the receive sensitivity of the reader. The two commands are respectively the Start Receive Test command and the Stop Receive Test command that are defined in the additional function category.

When the Start Receive Test command is issued, the reader enters a receive standby mode. In the receive standby mode, a BER can be measured. In the receive sensitivity test, an A/I packet, a bit pattern, or a PN code may be used. When receiving them, the reader must accumulatively add the number of successfully-received bits.

When the receive sensitivity test ends, the Stop Receive Test command is transmitted and thus the number of the successfully-received bits is received by a response. A ratio of the number of the successfully-received bit to the number of bits transmitted in a test environment is obtained to calculate the BER.

Meanwhile, the content of an A/I protocol packet for the receive sensitivity test is determined in the test environment. The reader must support to set and change the determined contents.

Industrial Applicability

According to the present invention, it is possible to provide a method of defining a protocol for controlling an RFID reader and an RFID reader control unit (e.g., processor) of a mobile terminal, and constructing and transmitting messages, information, commands, and responses between the RFID reader and the RFID reader control unit.

The invention claimed is:

1. A method of reading a data from a plurality of tag devices automatically, the method performed by a reading device and comprising:

receiving, from a mobile processor, an auto-read command instructing the reading device to perform an auto-reading operation reading the plurality of tag devices successively in a predetermined number of times automatically, wherein the auto-read command includes a first code specifying that a command is the auto-read command, a second code that indicates a code of a command to be repeated according to the auto-read command, and a number of repeat cycles, and wherein a particular type and a particular memory part of the plurality of the tag devices to be read by the auto-read command are determined according to the second code;

transmitting, to the mobile processor, a first notification message to transmit data read from the plurality of tag devices corresponding to the second code; and transmitting, to the mobile processor, a second notification message in a case that the auto-reading operation is completed by the predetermined number of times, wherein each of the first notification message and the second notification message includes a notification message code field and a notification message payload, wherein in case that the first notification message is generated, the second code included in the auto-read command is inserted into the notification message code field, and the data read by the auto-read command is inserted into the notification message payload, and wherein in case that the second notification message is generated, the first code included in the auto-read command is inserted into the notification message code field and a result code is inserted the notification message payload.

2. The method of claim 1, wherein the auto-read command, the first notification message, and the second notification message include a message code specifying a type of a message.

3. The method of claim 2, wherein each of the message codes included in the auto-read command and the first notification message is different from each other, and each of the message codes included in the auto-read command and the second notification message is different from each other.

4. A reading device, comprising:
an interface unit configured to transmit/receive data to/from an external module; and
a control unit configured to:
receive, from the external module via the interface unit, an auto-read command instructing the reading device to perform an auto-reading operation reading a plurality of tag devices successively in a predetermined number of times automatically,
wherein the auto-read command includes a first code specifying that a command is the auto-read command, a second code that indicates a code of a command to be repeated according to the auto-read command, and a number of repeat cycles, and
wherein a particular type and a particular memory part of the plurality of the tag devices to be read by the auto-read command are determined according to the second code;
transmit, to the external module via the interface unit, a first notification message to transmit data read from the plurality of tag devices corresponding to the second code; and
transmit, to the external module, a second notification message in a case that the auto-reading operation is completed by the predetermined number of times,
wherein each of the first notification message and the second notification message includes a notification message code field and a notification message payload,
wherein in case that the first notification message is generated, the second code included in the auto-read command is inserted into the notification message code field, and the data read by the auto-read command is inserted into the notification message payload, and
wherein in case that the second notification message is generated, the first code included in the auto-read command is inserted into the notification message code field and a result code is inserted the notification message payload.

5. The reading device of claim 4, wherein the auto-read command, the first notification message, and the second notification message include a message code specifying a type of a message.

6. The reading device of claim 5, wherein each of the message codes included in the auto-read command and the first notification message is different from each other, and each of the message codes included in the auto-read command and the second notification message is different from each other.

7. The method of claim 1, wherein a type of the first notification message is determined according to the second code and a type of the second notification message is determined by a predetermined type.

* * * * *